United States Patent
Li et al.

(10) Patent No.: US 10,863,073 B2
(45) Date of Patent: Dec. 8, 2020

(54) CONTROL METHOD FOR PHOTOGRAPHING USING UNMANNED AERIAL VEHICLE, PHOTOGRAPHING METHOD USING UNMANNED AERIAL VEHICLE, MOBILE TERMINAL, AND UNMANNED AERIAL VEHICLE

(71) Applicant: Tencent Technology (Shenzhen) Company Limited, Shenzhen (CN)

(72) Inventors: Jialun Li, Shenzhen (CN); Kaifeng Li, Shenzhen (CN); Jing Ning, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/959,014

(22) Filed: Apr. 20, 2018

(65) Prior Publication Data

US 2018/0288304 A1 Oct. 4, 2018

Related U.S. Application Data

(63) Continuation of application No. 15/957,749, filed on Apr. 19, 2018, now Pat. No. 10,587,790, which is a
(Continued)

(30) Foreign Application Priority Data

Nov. 4, 2015 (CN) .......................... 2015 1 0741059
Nov. 4, 2015 (CN) .......................... 2015 1 0741750
(Continued)

(51) Int. Cl.
*H04N 5/232* (2006.01)
*G05D 1/00* (2006.01)
(Continued)

(52) U.S. Cl.
CPC ....... *H04N 5/23206* (2013.01); *B64C 39/024* (2013.01); *G05D 1/0011* (2013.01);
(Continued)

(58) Field of Classification Search
CPC ........ H04N 5/23206; H04N 5/232061; H04W 76/14
(Continued)

(56) References Cited

U.S. PATENT DOCUMENTS 8,903,568 B1 * 12/2014 Wang .................. G05D 1/0016
701/2
2007/0244608 A1 10/2007 Rath et al.
(Continued)

FOREIGN PATENT DOCUMENTS

CN 101592955 A 12/2009
CN 102266672 A 12/2011
(Continued)

OTHER PUBLICATIONS

Tencent Technology, ISRWO, PCT/CN2016/082925, Aug. 19, 2016, 8 pgs.
(Continued)

*Primary Examiner* — Amir Shahnami
(74) *Attorney, Agent, or Firm* — Morgan, Lewis & Bockius LLP

(57) ABSTRACT

A method for operating an aircraft is performed by a mobile terminal. The mobile terminal displays an aircraft operation interface on a touchscreen of the mobile terminal and monitors a touch control operation applied on the aircraft operation interface. After determining that the touch control operation is detected, the mobile terminal acquires sensor data from one or more sensors of the mobile terminal and obtains an aircraft operation command according to the sensor data. Finally, the mobile terminal sends the aircraft
(Continued)

operation command to the aircraft that is wirelessly connected to the mobile terminal. The aircraft then performs a predefined operation according to the operation command.

20 Claims, 29 Drawing Sheets

Related U.S. Application Data continuation-in-part of application No. PCT/CN2016/082610, filed on May 19, 2016, which is a continuation-in-part of application No. PCT/CN2016/082925, filed on May 20, 2016, which is a continuation-in-part of application No. PCT/CN2016/083287, filed on May 25, 2016, which is a continuation-in-part of application No. PCT/CN2016/084973, filed on Jun. 6, 2016.

(30) Foreign Application Priority Data

Dec. 10, 2015 (CN) .......................... 2015 1 0919245
Dec. 23, 2015 (CN) .......................... 2015 1 0981628

(51) Int. Cl.
| | | |
|---|---|---|
| *B64C 39/02* | (2006.01) | |
| *G05D 1/10* | (2006.01) | |
| *G06F 3/0484* | (2013.01) | |
| *G06F 3/041* | (2006.01) | |
| *G06F 3/0488* | (2013.01) | |
| *H04W 76/14* | (2018.01) | |
| *G08C 17/02* | (2006.01) | |
| *G06F 1/16* | (2006.01) | |
| *H04N 1/00* | (2006.01) | |
| *B64C 27/08* | (2006.01) | |

(52) U.S. Cl.
CPC ......... *G05D 1/0016* (2013.01); *G05D 1/0022* (2013.01); *G05D 1/0038* (2013.01); *G05D 1/0094* (2013.01); *G05D 1/10* (2013.01); *G05D 1/101* (2013.01); *G06F 3/0416* (2013.01); *G06F 3/0488* (2013.01); *G06F 3/04845* (2013.01); *G08C 17/02* (2013.01); *H04N 5/23212* (2013.01); *H04N 5/23216* (2013.01); *H04N 5/23245* (2013.01); *H04N 5/23293* (2013.01); *H04N 5/23296* (2013.01); *H04N 5/23299* (2018.08); *H04N 5/232061* (2018.08); *H04W 76/14* (2018.02); *B64C 27/08* (2013.01); *B64C 2201/127* (2013.01); *B64C 2201/146* (2013.01); *G06F 1/1694* (2013.01); *G06F 3/04883* (2013.01); *G08C 2201/30* (2013.01); *G08C 2201/32* (2013.01); *G08C 2201/91* (2013.01); *G08C 2201/93* (2013.01); *H04N 1/00127* (2013.01); *H04N 1/00251* (2013.01); *H04N 1/00307* (2013.01); *H04N 1/00411* (2013.01); *H04N 1/00424* (2013.01); *H04N 1/00435* (2013.01); *H04N 1/00482* (2013.01); *H04N 2201/0013* (2013.01); *H04N 2201/0055* (2013.01); *H04N 2201/0096* (2013.01)

(58) Field of Classification Search
USPC .......................................... 348/114
See application file for complete search history.

(56) References Cited

U.S. PATENT DOCUMENTS

| | | | |
|---|---|---|---|
| 2009/0157233 A1 | 6/2009 | Kokkeby et al. | |
| 2010/0302359 A1 | 12/2010 | Adams et al. | |
| 2011/0173222 A1 | 7/2011 | Sayal et al. | |
| 2011/0246015 A1 | 10/2011 | Cummings et al. | |
| 2012/0016534 A1* | 1/2012 | Lee | G05D 1/0016 |
| | | | 701/2 |
| 2014/0371954 A1 | 12/2014 | Lee et al. | |
| 2016/0031559 A1* | 2/2016 | Zang | G05D 1/0038 |
| | | | 701/2 |
| 2016/0117853 A1* | 4/2016 | Zhong | B64C 39/024 |
| | | | 345/634 |
| 2016/0357183 A1* | 12/2016 | Shaw | G05D 1/0027 |

FOREIGN PATENT DOCUMENTS

| | | |
|---|---|---|
| CN | 102346479 A | 2/2012 |
| CN | 102591346 A | 7/2012 |
| CN | 103369115 A | 10/2013 |
| CN | 103426282 A | 12/2013 |
| CN | 104527978 A | 4/2015 |
| CN | 104598108 A | 5/2015 |
| CN | 104796611 A | 7/2015 |
| CN | 104808680 A | 7/2015 |
| CN | 104828256 A | 8/2015 |
| CN | 104880177 A | 9/2015 |
| CN | 104917966 A | 9/2015 |
| CN | 105120011 A | 12/2015 |
| CN | 105141851 A | 12/2015 |
| CN | 105391939 A | 3/2016 |
| CN | 105425952 A | 3/2016 |
| CN | 105549604 A | 5/2016 |
| CN | 105635256 A | 6/2016 |

OTHER PUBLICATIONS

Tencent Technology, IPRP, PCT/CN2016/082925, May 8, 2018, 7 pgs.
Tencent Technology, ISRWO, PCT/CN2016/082610 Jul. 26, 2016, 9 pgs.
Tencent Technology, IPRP, PCT/CN2016/082610, Jul. 26, 2016, 8 pgs.
Tencent Technology, ISRWO, PCT/CN2016/083287, Aug. 4, 2016, 2 pgs.
Tencent Technology, ISRWO, PCT/CN2016/084973, Sep. 27, 2016, 2 pgs.
Tencent Technology, WO, PCT/CN2016/083287, Aug. 4, 2016, 6 pgs.
Tencent Technology, IPRP, PCT/CN2016/083287, Jun. 12, 2018, 7 pgs.
Tencent Technology, WO, PCT/CN2016/084973, Sep. 27, 2016, 7 pgs.
Tencent Technology, IPRP, PCT/CN2016/084973, Jun. 26, 2018, 8 pgs.

* cited by examiner

CONTROL METHOD FOR PHOTOGRAPHING USING UNMANNED AERIAL VEHICLE, PHOTOGRAPHING METHOD USING UNMANNED AERIAL VEHICLE, MOBILE TERMINAL, AND UNMANNED AERIAL VEHICLE

RELATED APPLICATIONS

This application is a continuation of: (i) U.S. patent application Ser. No. 15/957,749, entitled "UNMANNED AERIAL VEHICLE PHOTOGRAPHING CONTROL METHOD, UNMANNED AERIAL VEHICLE PHOTOGRAPHING METHOD, MOBILE TERMINAL AND UNMANNED AERIAL VEHICLE" filed on Apr. 19, 2018, which is a continuation-in-part of (ii) PCT/CN2016/082610, entitled "UNMANNED AERIAL VEHICLE PHOTOGRAPHING CONTROL METHOD, UNMANNED AERIAL VEHICLE PHOTOGRAPHING METHOD, MOBILE TERMINAL AND UNMANNED AERIAL VEHICLE" filed on May 19, 2016, which claims the benefit of Chinese Patent Application No. 201510741059.0, filed with the State Intellectual Property Office of the People's Republic of China on Nov. 4, 2015, and entitled "UNMANNED AERIAL VEHICLE PHOTOGRAPHING CONTROL METHOD AND APPARATUS, UNMANNED AERIAL VEHICLE PHOTOGRAPHING METHOD, AND UNMANNED AERIAL VEHICLE"; (iii) PCT/CN2016/082925, entitled "METHOD FOR PROVIDING INTERACTIVE DRONE CONTROL INTERFACE, PORTABLE ELECTRONIC APPARATUS AND STORAGE MEDIUM" filed on May 20, 2016, which claims the benefit of Chinese Patent Application No. 201510741750.9, filed with the State Intellectual Property Office of the People's Republic of China on Nov. 4, 2015, and entitled "INTERACTIVE METHOD AND APPARATUS FOR CONTROL INTERFACE OF UNMANNED AERIAL VEHICLE"; (iv) PCT/CN2016/083287, entitled "AIRCRAFT CONTROL METHOD, MOBILE TERMINAL AND STORAGE MEDIUM" filed on May 25, 2016, which claims the benefit of Chinese Patent Application No. 201510919245.9 filed with the State Intellectual Property Office of the People's Republic of China on Dec. 10, 2015, and entitled "AIRCRAFT CONTROL METHOD AND APPARATUS" and (v) PCT/CN2016/084973, entitled "MULTIMEDIA SYNCHRONIZATION METHOD AND SYSTEM, AERIAL VEHICLE, AND STORAGE MEDIUM" filed on Jun. 6, 2016, which claims the benefit of Chinese Patent Application No. 201510981628.9, filed with the State Intellectual Property Office of the People's Republic of China on Dec. 23, 2015, and entitled "MULTIMEDIA SYNCHRONIZATION METHOD, DEVICE AND SYSTEM", all of which are incorporated herein by reference in their entirety.

FIELD OF THE TECHNOLOGY

The present disclosure relates to the technical field of unmanned aerial vehicles (UAV), and in particular, to a method of photographing using a UAV, an interface interaction method for operating a UAV a photographing method using a UAV, a mobile terminal, a multimedia synchronization method and system, and a storage medium.

BACKGROUND OF THE DISCLOSURE

As various aircrafts emerge, more and more users want to use a mobile terminal to operate an aircraft. An aircraft can be operated to take pictures at places beyond the reach of people. Aircrafts are nowadays widely applied to industry, life, and entertainment. Generally, a picture or a video taken by an aircraft can only be stored locally in the aircraft. After the aircraft finishes photographing, a storage device such as an SD memory card used in the aircraft is removed and then connected to a computer for viewing. How to synchronize multimedia between a mobile terminal and an aircraft is a problem that needs to be resolved.

A UAV is a remotely piloted unmanned aircraft. Different types of UAVs include a helicopter UAV, a fixed-wing UAV, a multi-rotary-wing UAV, a blimp UAV, a flexible-wing UAV, and the like. UAVs are originally used for military applications, and are mainly used as surveillance aircrafts and target drones.

Existing manners of operating a UAV include using a transmission signal of an auxiliary remote control to operate a UAV and using a mobile phone to operate a UAV by using a Wi-Fi or Bluetooth signal transmitted by the UAV. When a remote control is used to operate a UAV, if an image taken by the UAV needs to be displayed in real time, an image relay needs to be added. The UAV converts a picture into a signal and sends the signal to the relay. A mobile phone, a tablet computer or the like receives, in real time by using a Wi-Fi signal transmitted by the connected relay, the image taken by the UAV. This operation manner has high costs and requires a large volume.

When a mobile phone is used to operate a UAV, a virtual joystick is usually displayed on a screen of the mobile phone to control the UAV. A user needs to focus on the virtual joystick on the screen. Moreover, because an operation interface and an image transmission interface of the UAV are separate, the user needs to use the virtual joystick to perform continuous adjustment operations on the UAV. Because the virtual joystick has relatively low feedback performance, the user needs to be highly skilled to perform precise operations, causing great difficulty in use by the user.

As production costs of UAVs decrease, UAVs are gradually used for civilian applications. Currently, a photographing apparatus may be mounted on a UAV, and a user may remotely control the UAV to implement aerial photography, so as to provide the user with new photographing angles. This is applicable to both portrait photography and landscape photography.

However, it is fairly difficult to operate a UAV, and even more difficult to control a photographing apparatus to capture an image. A user needs to reach a specific level of operation skills. It is particularly difficult for a novice user of a UAV. Therefore, at present, complex operations are involved to capture an image by using a UAV, and an improvement needs to be made.

SUMMARY

According to various embodiments of the present application, a method for operating an aircraft using a mobile terminal, and a storage medium are provided.

According a first aspect of the present application, a method for operating an aircraft is performed by a mobile terminal. The mobile terminal displays an aircraft operation interface on a touchscreen of the mobile terminal and monitors a touch control operation applied on the aircraft operation interface. After determining that the touch control operation is detected, the mobile terminal acquires sensor data from one or more sensors of the mobile terminal and obtains an aircraft operation command according to the sensor data. Finally, the mobile terminal sends the aircraft operation command to the aircraft that is wirelessly connected to the mobile terminal. The aircraft then performs a predefined operation according to the operation command.

According to a second aspect of the present application, a mobile terminal includes one or more processors, memory and a plurality of computer readable instructions stored in the memory. The computer readable instructions, when executed by the one or more processors, cause the one or more processors to perform the aforementioned method.

According to a third aspect of the present application, a non-transitory computer-readable storage medium stores instructions that, when executed by a mobile terminal having one or more processors, cause the one or more processors to perform the aforementioned method.

Details of one or more embodiments of the present application are provided in the following accompanying drawings and descriptions. Other features, objectives, and advantages of the present disclosure will become apparent from the specification, accompanying drawings, and claims.

BRIEF DESCRIPTION OF THE DRAWINGS

To describe the technical solutions of the embodiments of the present application or the existing technology more clearly, the following briefly introduces the accompanying drawings required for describing the embodiments or the existing technology. Apparently, the accompanying drawings in the following description show only some embodiments of the present application, and a person of ordinary skill in the art may still derive other drawings from these accompanying drawings without creative efforts.

DESCRIPTION OF EMBODIMENTS

To make the objectives, technical solutions, and advantages of the present disclosure more comprehensible, the present disclosure is described in further detail with reference to the accompanying drawings and embodiments. It should be understood that, specific embodiments described herein are merely used to explain the present disclosure instead of limiting the present disclosure.

Figure 1:
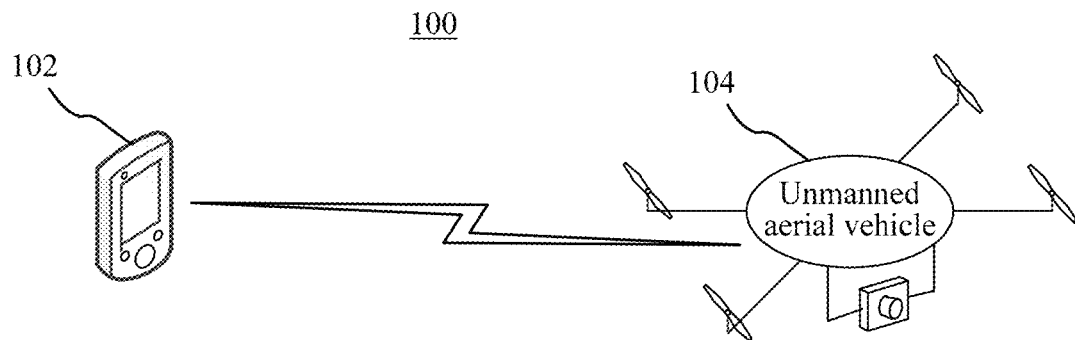
FIG. 1 is a diagram of an application environment of a control system for photographing using a UAV in some embodiments.

As shown in FIG. 1, in some embodiments, a control system 100 for photographing using a UAV is provided. The control system 100 for photographing using a UAV includes a mobile terminal 102 and a UAV 104. A wireless connection is established between the mobile terminal 102 and the UAV 104. Data is transmitted between the mobile terminal 102 and the UAV 104 by using the wireless connection. The UAV 104 may be any one of a fixed-wing UAV, a rotary-wing UAV, a flexible-wing UAV, a flapping-wing UAV, and a blimp UAV.

Figure 2:
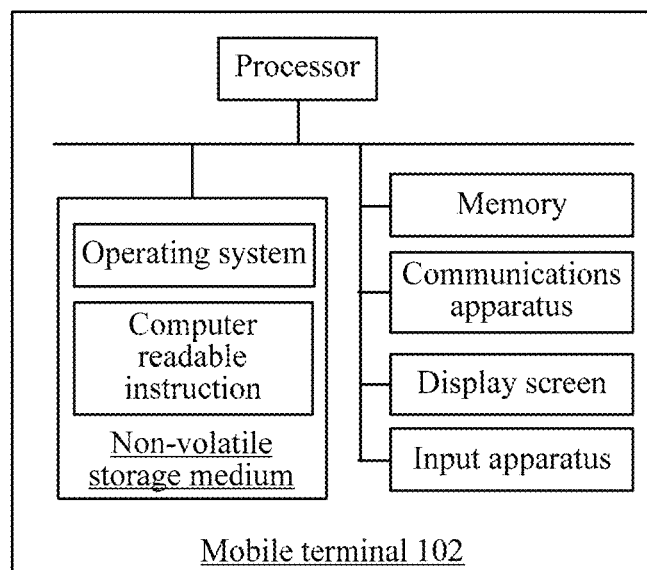
FIG. 2 is a schematic diagram of a compositional structure of a mobile terminal in some embodiments.

As shown in FIG. 2, in some embodiments, a mobile terminal 102 is provided. The mobile terminal 102 includes a processor, a non-volatile storage medium, a memory, a communications apparatus, a display screen, and an input apparatus that are connected through a system bus. The processor has a calculation function and a function of controlling the mobile terminal 102 to work. The processor is configured to perform a control method for photographing using a UAV. The non-volatile storage medium includes at least one of a magnetic storage medium, an optical storage medium, and a flash memory storage medium. The non-volatile storage medium stores an operating system. The non-volatile storage medium or the memory may store computer readable instructions. The computer readable instructions, when executed by the processor, cause the processor to perform the control method for photographing using a UAV. The memory is configured to provide a high-speed cache to the operating system and for the computer readable instructions. The communications apparatus is configured to perform wireless communication with a UAV 104. The display screen includes at least one of a liquid crystal display screen, a flexible display screen, and an e-ink display screen. The input apparatus includes at least one of a physical button, a track ball, a touch panel, and a touch control layer that is superimposed on the display screen, where the touch control layer and the display screen are combined to form a touch control screen.

Figure 3:
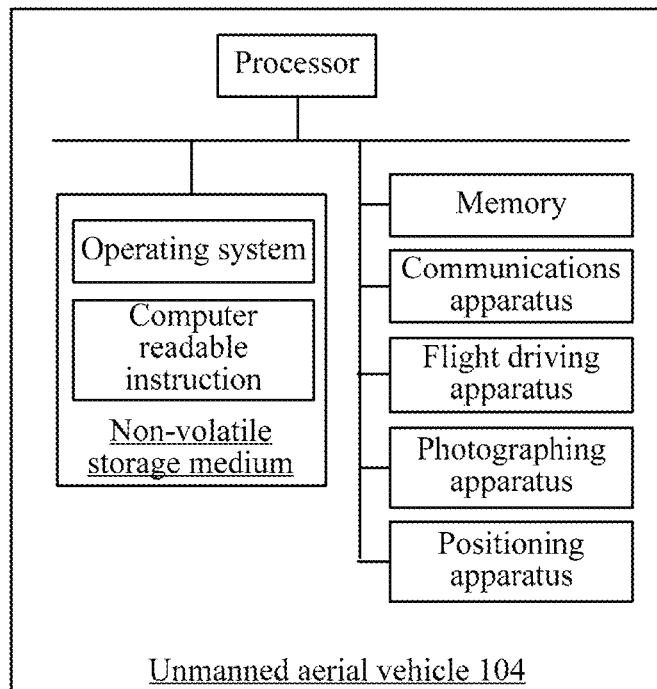
FIG. 3 is a schematic diagram of a compositional structure of a UAV in some embodiments.

As shown in FIG. 3, in some embodiments, a UAV 104 is provided. The UAV 104 includes a processor, a non-volatile storage medium, a memory, a communications apparatus, a flight driving apparatus, a photographing apparatus, and a positioning apparatus that are connected through a system bus. The processor has a calculation function and a function of controlling the UAV 104 to work. The processor is configured to perform a photographing method using a UAV. The non-volatile storage medium includes at least one of a magnetic storage medium, an optical storage medium, and a flash memory storage medium. The non-volatile storage medium stores an operating system. The non-volatile storage medium and the memory may store computer readable instructions. The computer readable instructions, when executed by the processor, cause the processor to perform the photographing method using a UAV. The memory is configured to provide a high-speed cache to the operating system and for the computer readable instructions. The communications apparatus is configured to perform wireless communication with a mobile terminal 102. The flight driving apparatus is configured to control a UAV flight action of the UAV 104, and mainly controls a flight speed and a flight direction of the UAV 104 to control the UAV flight action. For a rotary-wing UAV, the flight driving apparatus mainly includes a rotary wing and a rotary-wing control apparatus. The photographing apparatus is configured to capture an image. The taken image includes a picture and a video. The positioning apparatus may be a Global Positioning System (GPS) positioning apparatus, and is configured to locate the UAV 104.

Figure 4:
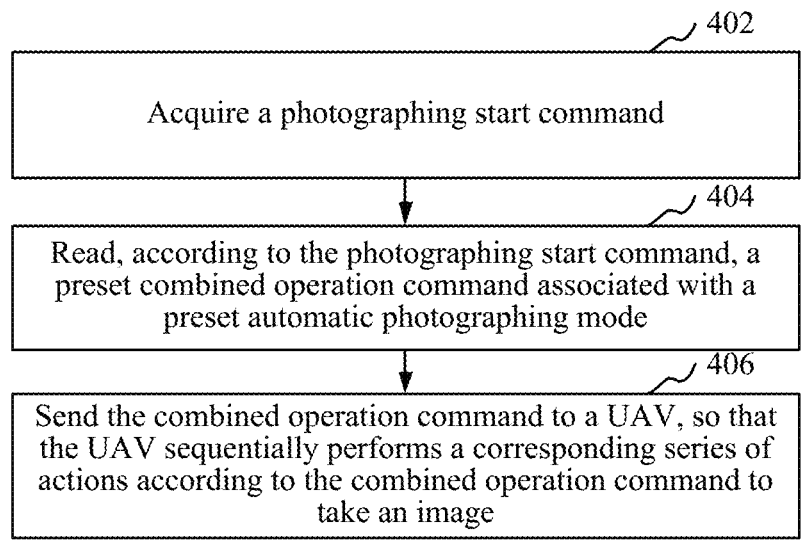
FIG. 4 is a schematic flowchart of a control method for photographing using a UAV in some embodiments.

As shown in FIG. 4, in some embodiments, a control method for photographing using a UAV is provided. This embodiment is described by using an example in which the method is applied to the mobile terminal 102 in the foregoing FIG. 1 and FIG. 2. The method specifically includes the following steps:

Step 402: Acquire a photographing start command.

A photographing application program runs on the mobile terminal. The photographing application program may be a built-in system application program or a third-party application program. The photographing application program may be used to implement steps of the control method for photographing using a UAV. Specifically, the mobile terminal may monitor a predefined event, and when detecting the predefined event, acquires the photographing start command. In some embodiments, the terminal may monitor the predefined event and start to measure a time when detecting the predefined event. When the measured time reaches preset duration, the terminal acquires the photographing start command.

In some embodiments, the mobile terminal may display a photographing start control, and monitor an operation on the photographing start control to acquire a corresponding photographing start command. For example, the mobile terminal may display a photographing start control 502 on a UAV-photographing page shown in FIG. 5. A user may trigger the photographing start command by clicking the photographing start control 502.

An operation on the photographing start control includes at least one of a cursor click operation, a tap operation, and a gesture operation. The photographing start command is used to start to control, according to a determined preset automatic photographing mode, a UAV to perform automatic photographing.

In some embodiments, the mobile terminal may monitor a shake of the body of the mobile terminal. When detecting a shake, the mobile terminal acquires the corresponding photographing start command. In some embodiments, the mobile terminal may monitor a voice command input to acquire a photographing start command in a voice form. In some embodiments, the photographing start command includes a photographic sample. As described below in connection with FIG. 10, the photographic sample is used by the mobile terminal for determining flight parameters and photographing parameters to be transmitted to the UAV for performing the corresponding photographic tasks.

In some embodiments, the control method for photographing using a UAV further includes: determining a preset automatic photographing mode. Specifically, the mobile terminal may determine the preset automatic photographing mode by using the photographing application program. The preset automatic photographing mode is a manner of implementing a predefined automatic photographing action by using a customized parameter.

In some embodiments, the preset automatic photographing mode includes an automatic photographing mode with a locked target and an automatic photographing mode without a locked target. The automatic photographing mode with a locked target is a manner of performing automatic photographing by using a locked target as a photographed object. The automatic photographing mode without a locked target may be referred to as a landscape automatic photographing mode, and is a photographing manner of performing automatic photographing without using a specific target as a photographed object.

In some embodiments, the mobile terminal may select a default preset automatic photographing mode and determine the default preset automatic photographing mode as a currently used preset automatic photographing mode. In another embodiment, the mobile terminal may further select a preset automatic photographing mode used during a previous time of photographing and determine the preset automatic photographing mode as a currently used preset automatic photographing mode.

In some embodiments, the mobile terminal may provide multiple options for preset automatic photographing modes, and monitor an operation command that is applied on one option to determine a chosen preset automatic photographing mode, so as to determine the chosen preset automatic photographing mode as a currently used preset automatic photographing mode.

Figure 5:
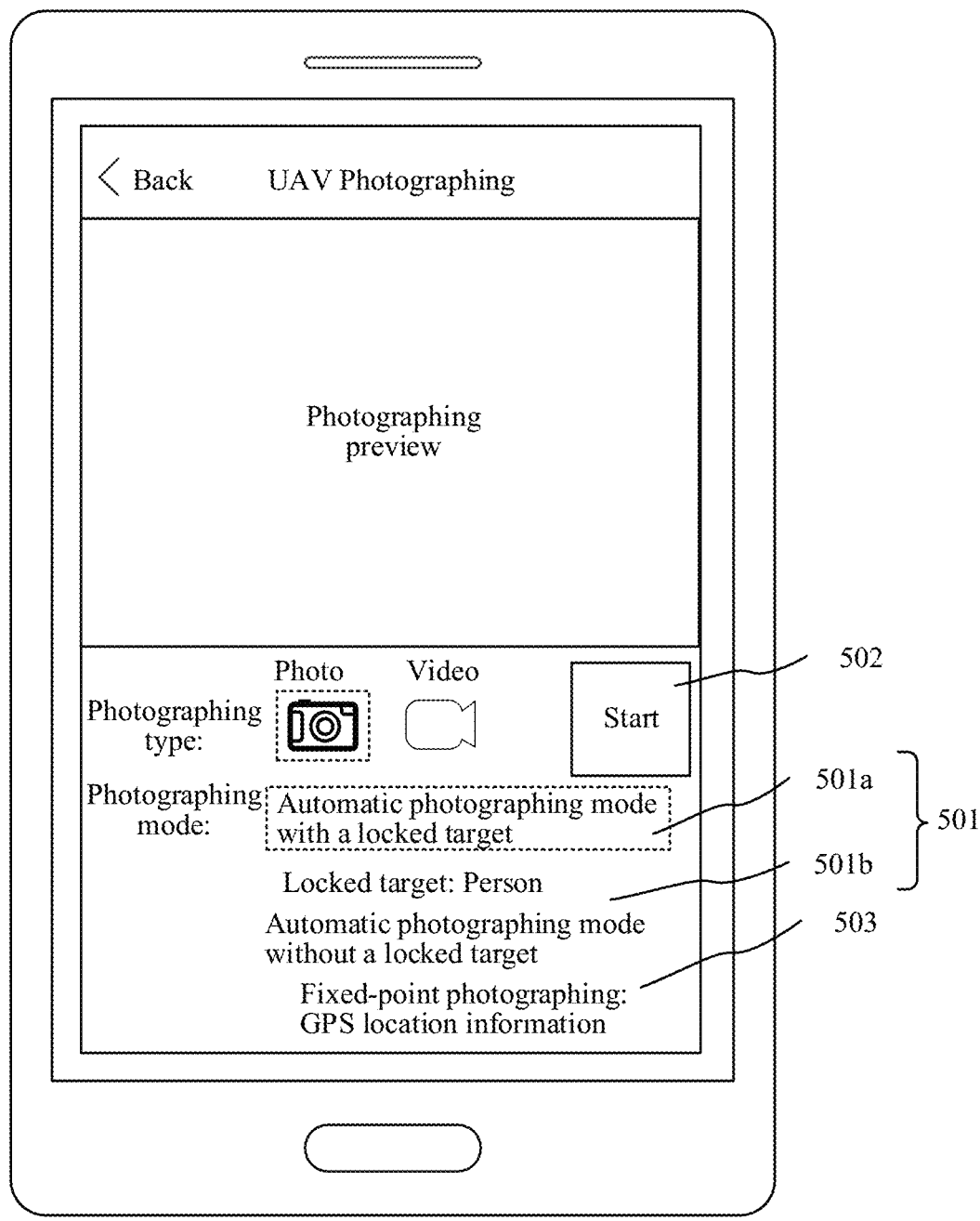
FIG. 5 is a schematic diagram of a UAV-photographing page displayed by a mobile terminal in some embodiments.

For example, after starting a photographing application, the mobile terminal may enter the UAV-photographing page shown in FIG. 5. Two options 501 for preset automatic photographing modes, that is, an option 501a for an automatic photographing mode with a locked target and an option 501b for an automatic photographing mode without a locked target, are displayed on the UAV-photographing page. The user may determine, by clicking the option 501a, the currently used preset automatic photographing mode to be the automatic photographing mode with a locked target. Alternatively, the user may determine, by clicking an option 501b, the currently used preset automatic photographing mode to be the automatic photographing mode without a locked target.

Step 404: Read, according to the photographing start command, a preset combined operation command associated with a preset automatic photographing mode.

Specifically, after acquiring the photographing start command, the mobile terminal may locally read the preset combined operation command associated with the determined preset automatic photographing mode. The combined operation command is used to trigger a series of sequential combined actions of the UAV to accomplish automatic photographing.

In some embodiments, the mobile terminal may periodically check whether a combined operation command associated with the preset automatic photographing mode exists on a server. If a combined operation command associated with the preset automatic photographing mode exists on a server, the mobile terminal downloads the updated combined operation command to update a local preset combined operation command associated with the preset automatic photographing mode. In another embodiment, periodical check may be replaced with check performed when an operation that is triggered by a user and is for updating a combined operation command is detected.

In some embodiments, the mobile terminal may download, when receiving a notification that is pushed by the server and is used for updating a combined operation command, the updated combined operation command from the server, so as to update the local preset combined operation command associated with the preset automatic photographing mode.

Step 406: Send the combined operation command to a UAV, so that the UAV sequentially performs a corresponding series of actions according to the combined operation command to capture an image.

Specifically, the mobile terminal may send the read combined operation command to the UAV by using a wireless connection between the mobile terminal and the UAV. For the wireless connection, a wireless local area network connection such as a Wi-Fi connection or a WAPI connection may be used, or a normal radio connection may be used. After receiving the combined operation command sent by the mobile terminal, the UAV performs the series of actions specified in the combined operation command to accomplish a task of automatically taking an image.

In some embodiments, the series of actions includes at least one of a UAV flight action, a photographing view adjustment action, and a photographing parameter adjustment action.

In some embodiments, the UAV flight action includes at least one of a UAV flight-speed adjustment action, a UAV direction adjustment action, a UAV height adjustment action, a UAV hover action, a UAV roll action, and a UAV yaw action.

In some embodiments, the photographing view adjustment action includes panning and zooming of a photographing view. The photographing view is a spatial range photographed by a photographing apparatus of the UAV. Specifically, the mobile terminal may control rotation of the UAV and/or the photographing apparatus to implement panning of the photographing view, and may further move the UAV or adjust a focal length of the photographing apparatus to implement zooming of the photographing view.

In some embodiments, a photographing parameter includes at least one of sensitivity to light (an ISO value), an aperture value, a shutter speed, a focal length, an automatic focusing mode, a metering mode, and white balance. The automatic focusing mode includes at least one of a metering automatic focusing mode based on measurement of a distance between a lens of a photographing apparatus and a photographed target and a focusing-monitoring automatic focusing mode based on clear imaging. The metering mode includes at least one of a spot metering mode, a partial metering mode, a center-weighted average metering mode, an average metering mode, and a multi-zone metering mode.

In the foregoing control method for photographing using a UAV, after a photographing start command is detected, a preset combined operation command associated with a preset automatic photographing mode may be automatically read and sent to a UAV. The UAV may sequentially perform a series of actions according to the combined operation command to capture an image. In this way, a user does not need to directly operate a UAV to fly and perform photographing, and only needs to choose a preset automatic photographing mode and trigger a photographing start command to control the UAV to automatically accomplish a photographing task, so that operations are simplified, and operation convenience is improved.

In some embodiments, the control method for photographing using a UAV further includes: receiving the taken image returned by the UAV, and storing the taken image. Specifically, the UAV may transmit the taken image to the mobile terminal in real time by using the wireless connection, and the mobile terminal receives the image returned by the UAV, and stores the image in a preset directory. In some embodiments, the mobile terminal may receive multiple images continuously taken by the UAV, pick one image having the highest resolution, and store the image. In some embodiments, the mobile terminal may receive a series of images continuously taken by the UAV, and store the images according to a preset video format.

In some embodiments, the mobile terminal may periodically check whether an updated preset automatic photographing mode exists on the server, and if the updated preset automatic photographing mode exists, download the updated preset automatic photographing mode and an associated combined operation command, so as to update a local preset automatic photographing mode and an associated preset combined operation command. In another embodiment, periodic check may be replaced with check upon detection of an operation of updating the combined operation command.

In some embodiments, when receiving a notification that is pushed by the server and is for updating a preset automatic photographing mode, the mobile terminal may download an updated preset automatic photographing mode and an associated combined operation command from the server, so as to update a local preset automatic photographing mode and an associated preset combined operation command.

In some embodiments, when the preset automatic photographing mode is an automatic photographing mode with a locked target, step 406 includes: sending the combined operation command to the UAV, so that the UAV acquires a locked target, a preset flight parameter, and a preset photographing parameter according to the combined operation command, so as to keep the locked target in a photographing view, adjust, according to the flight parameter, a spatial location of the UAV relative to the locked target to fly, and capture an image according to the photographing parameter in flight.

Specifically, the automatic photographing mode with a locked target is an automatic photographing mode in which an object to be photographed is a locked target. The locked target may be any target that can be recognized from the photographing view through image recognition, and includes at least one of a person, a building, a vehicle, a plant, and the like.

When the preset automatic photographing mode is an automatic photographing mode with a locked target, the UAV acquires a locked target, a preset flight parameter, and a preset photographing parameter according to the corresponding combined operation command. Further, the UAV keeps the locked target in the photographing view, and flies according to the acquired flight parameter, so as to adjust the spatial location relative to the locked target in flight, enabling the UAV to fly along a fixed trajectory relative to the locked target and capture an image according to the acquired photographing parameter in flight.

The flight parameter includes a change parameter of the spatial location of the UAV relative to the locked target, and may further include a flight speed parameter or a body rotation parameter. A spatial location and a flight direction of the UAV may be determined according to the change parameter of the spatial location, a flight speed of the UAV may be determined according to the flight speed parameter, and body rotation of the UAV in flight may be adjusted according to the body rotation parameter.

The UAV may specifically keep the locked target in the photographing view according to at least one of the body rotation parameter, a lens turning parameter, and a focal length adjustment parameter. The body rotation parameter is included in the flight parameter, and the lens turning parameter and the focal length adjustment parameter are included in the photographing parameter.

When adjusting the spatial location of the UAV relative to the locked target, the UAV may adjust a location of the UAV in a three-dimensional coordinate system according to the change parameter of the spatial location of the UAV relative to the locked target, so that a relationship between the location of the UAV in the three-dimensional coordinate system and a location of the locked target in the three-dimensional coordinate system meets the foregoing change parameter of the spatial location.

Figure 6:
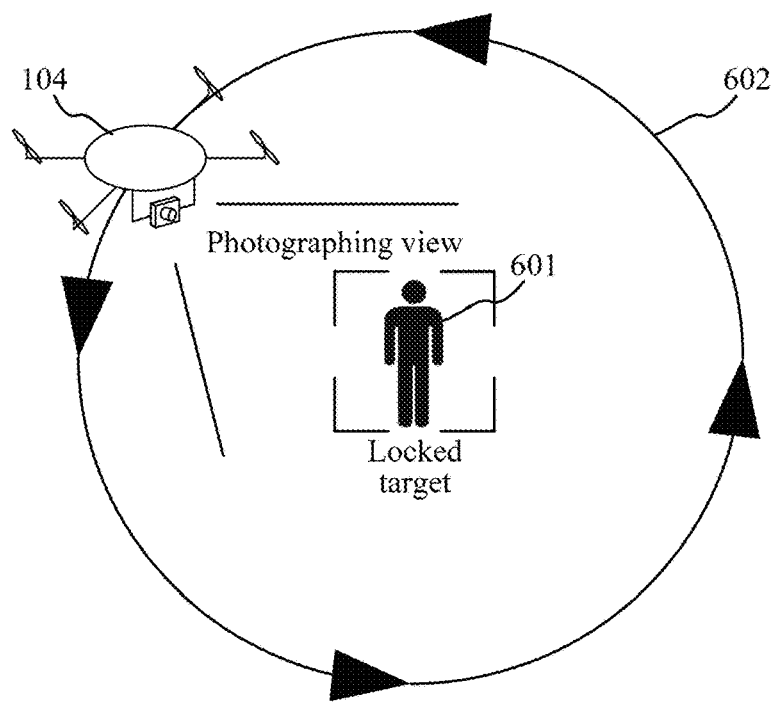
FIG. 6 is a schematic diagram of a UAV flying along a fixed trajectory relative to a locked target according to an acquired flight parameter in some embodiments.

For example, referring to FIG. 6, a UAV 104 may fly along a fixed trajectory 602 relative to a locked target 601 according to the acquired flight parameter. The UAV 104 adjusts a photographing view in flight to keep a locked target 601 in the photographing view, and takes an image according to the acquired photographing parameter. In this way, a video or a composite picture that includes multiple angles of the locked target may be photographed.

Figure 7:
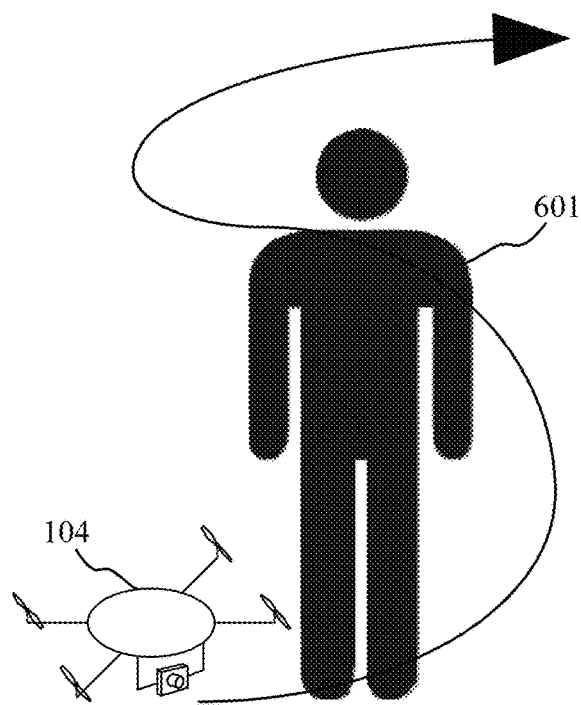
FIG. 7 is a schematic diagram of a UAV flying along a fixed trajectory relative to a locked target according to an acquired flight parameter in another embodiment.

There may be various fixed trajectories of the UAV relative to the locked target. For example, the fixed trajectory may be a trajectory in one plane, for example, a circular trajectory in a horizontal plane or a vertical plane shown in FIG. 6. The fixed trajectory may be a three-dimensional trajectory, for example, a spiral trajectory shown in FIG. 7. In FIG. 7, the UAV starts from the ground and spirals up along a spiral trajectory with the locked target 601 being the center, till the UAV reaches a preset height or the locked target leaves the photographing view.

In some embodiments, when acquiring a locked target according to the combined operation command, the UAV may search the photographing view for a target, make a mark on the found target in a preview image of the photographing view, and return the preview image to the mobile terminal. The mobile terminal may display the preview image and the mark on the found target, and monitor a selection command on the displayed mark, so as to use a target corresponding to a mark selected by a selection command as the locked target and notify the UAV of the target, to enable the UAV to obtain the locked target.

Figure 8:
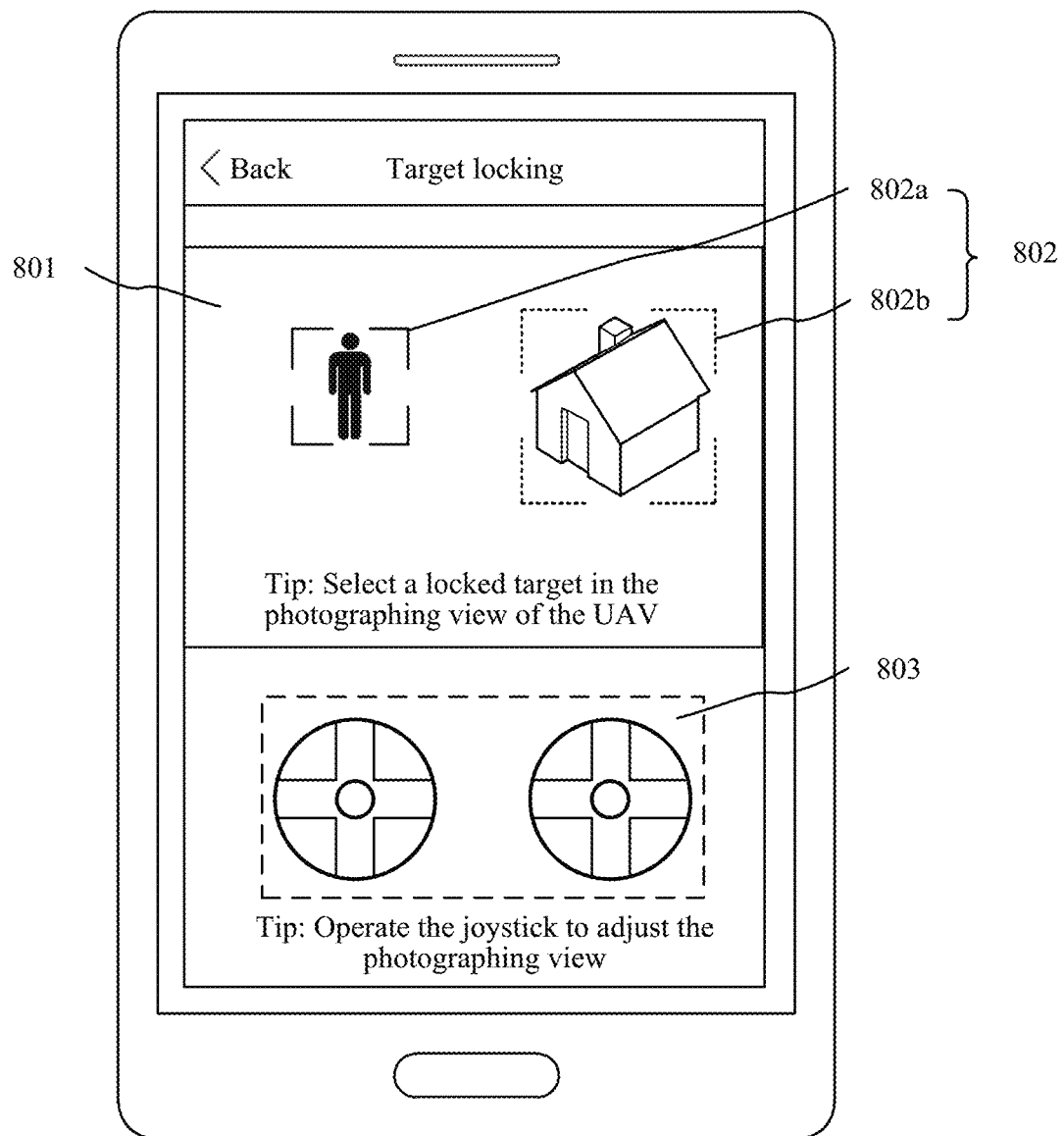
FIG. 8 is a schematic diagram of a target locking page displayed by a mobile terminal in some embodiments.

For example, the mobile terminal may provide a target locking page shown in FIG. 8, so as to display, on the target locking page, a preview image 801 provided by the UAV, and display, in the preview image 801, a mark 802 on the found target. The mark 802 includes a mark 802a on a portrait target and a mark 802b on a building target. The user may click the mark 802a to choose the corresponding portrait target. The target locking page may further provide a joystick control 803. The mobile terminal monitors an operation on the joystick control 803 to adjust the photographing view of the UAV.

In some embodiments, when acquiring a locked target according to the combined operation command, the UAV may search the photographing view for targets, and automatically determine the locked target from the found targets according to a preset strategy. For example, the UAV may determine a locked target according to a priority of a locked target, for example, preferentially use a portrait target as a locked target; or may further determine a target having the largest area as a locked target.

In the foregoing embodiment, in an automatic photographing mode with a locked target, a mobile terminal may control a UAV to use a locked target as a photographed object to automatically fly and perform photographing to obtain an image. In this way, a user does not need to learn complex techniques of operating a UAV and performing photographing to photograph an image of a specific target at a particular level, so that operations are simple, and operation convenience is improved.

In some embodiments, when the preset automatic photographing mode is an automatic photographing mode without a locked target, step 406 includes: sending the combined operation command to the UAV, so that the UAV acquires a preset flight parameter and a preset photographing parameter according to the combined operation command, and when the UAV is controlled according to the flight parameter to fly along a preset flight trajectory, the UAV takes an image according to the photographing parameter.

Specifically, in an automatic photographing mode without a locked target, the UAV does not use a specific target as a photographed object, but instead, is controlled by using the combined operation command to fly along the preset flight trajectory and capture an image according to the preset photographing parameter in flight. In this way, the automatic photographing mode without a locked target is particularly suitable for photographing of a landscape image.

The preset flight trajectory may be any predefined usable flight trajectory, for example, a closed shape or an open shape in any plane in space, for example, a closed shape such as a circle or a polygon, or may further be an open shape such as an arc and a broken line. The preset flight trajectory may further be a three-dimensional shape in space such as a spiral trajectory.

Figure 9:
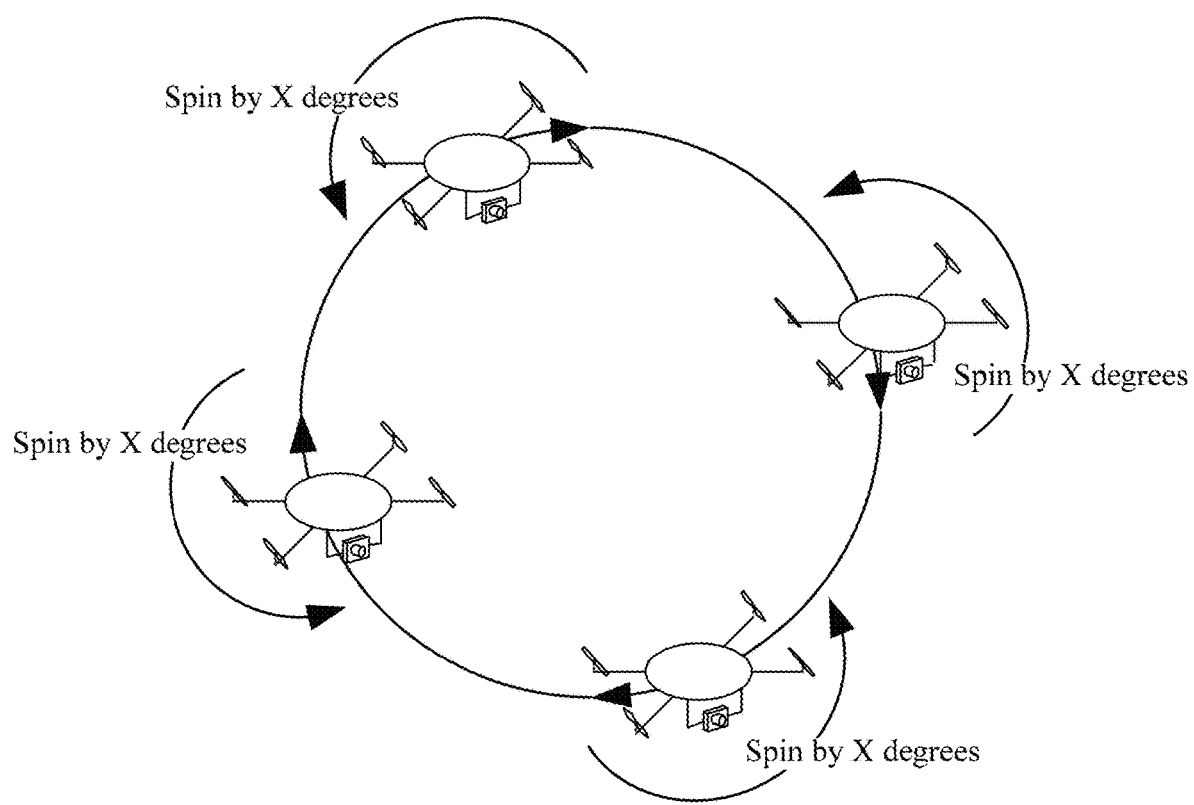
FIG. 9 is a schematic diagram of a UAV flying along a preset circular flight trajectory on a horizontal plane in an automatic photographing mode without a locked target in some embodiments.

For example, referring to FIG. 9, in the automatic photographing mode without a locked target, the UAV may fly along a preset circular flight trajectory on a horizontal plane. Being a point of tangency, the UAV has a tangent line on the preset flight trajectory. When flying along the preset flight trajectory, the UAV spins in a direction opposite to a rotating direction of the preset flight trajectory, so that the photographing view of the UAV is kept on one side of a tangent line corresponding to a point of tangency at which the UAV is currently at, so as to capture an image. In this way, a horizontal panoramic landscape image may be automatically photographed.

In the foregoing embodiment, in an automatic photographing mode without a locked target, a mobile terminal may control a UAV to automatically fly along a preset flight trajectory and perform photographing to obtain an image. In this way, a user does not need to learn complex techniques of operating a UAV and performing photographing to photograph a landscape image at a particular level, so that operations are simple, and operation convenience is improved.

In some embodiments, when the preset automatic photographing mode is an automatic photographing mode without a locked target, step 406 includes: acquiring specified geographical location information, sending the geographical location information and the combined operation command to the UAV, so that the UAV acquires a preset flight parameter and a preset photographing parameter according to the combined operation command, and after the UAV flies to the geographical location information, controls, according to the flight parameter, the UAV to fly along a preset flight trajectory and capture an image according to the photographing parameter.

Specifically, the geographical location information is information used for representing a geographical location, where longitude and latitude are used for representation, or three-dimensional coordinates in a three-dimensional coordinate system are used for representation.

When the mobile terminal acquires specified geographical location information, the mobile terminal may specifically acquire input geographical location information as the specified geographical location information. The mobile terminal may alternatively receive a preview image transmitted in real time by the UAV and display the preview image, choose a geographical location according to an operation of the user on the geographical location in the preview image, and acquire information about the chosen geographical location as the specified geographical location information. The mobile terminal may alternatively display an electronic map of a current region of the UAV, choose a geographical location according to an operation of the user on the electronic map, and acquire information about the chosen geographical location as the specified geographical location information.

The UAV may acquire the specified geographical location information and current geographical location information of the UAV, and may determine a flight path of the UAV according to the two pieces of geographical location information, so that the UAV automatically flies to the specified geographical location information. Next, the UAV may fly along the preset flight trajectory under the control of the combined operation command, and capture an image according to the preset photographing parameter in flight.

For example, the mobile terminal may display, on the UAV-photographing page shown in FIG. 5, an input control 503 for geographical location information of fixed-point photographing. The user inputs GPS geographical location information in the input control 503, and may specified geographical location information of fixed-point photographing, so as to control the UAV to start, when flying to the specified geographical location information, to automatically perform photographing along the preset flight trajectory.

In the foregoing embodiment, in an automatic photographing mode without a locked target, a mobile terminal may control a UAV to start, at a specific position, to automatically fly along a preset flight trajectory and perform photographing to obtain an image. In this way, a user does not need to learn complex techniques of operating a UAV and performing photographing to photograph a landscape image at a specific position by using the UAV, so that operations are convenient. In addition, automatic fixed-point photographing without a locked target can further satisfy a photographing requirement of the user.

Figure 10:
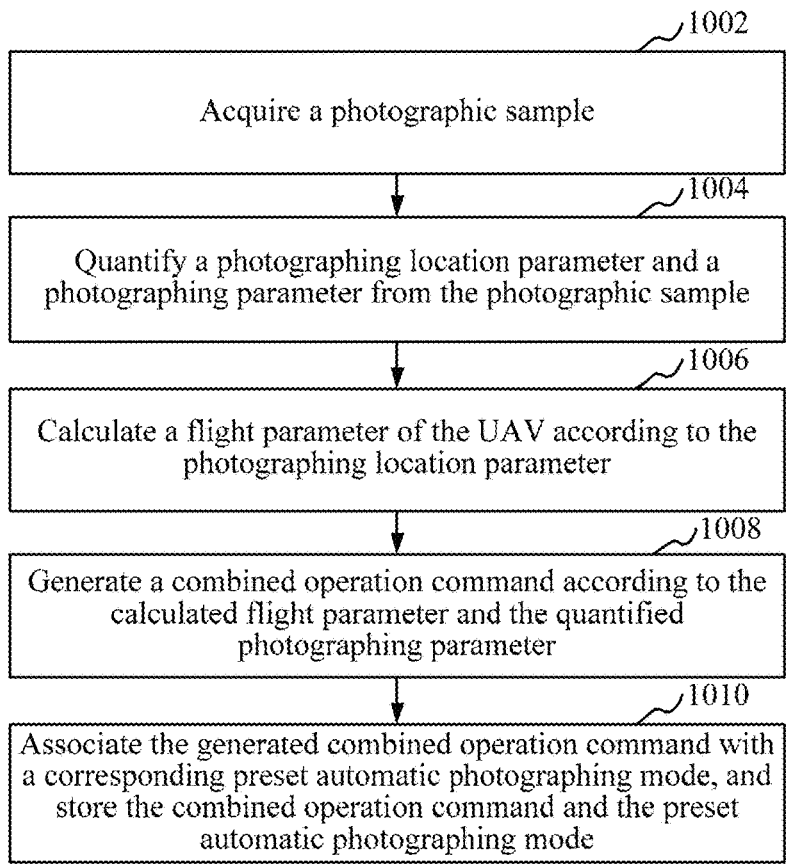
FIG. 10 is a schematic flowchart of steps of obtaining a combined operation command in some embodiments.

As shown in FIG. 10, in some embodiments, the control method for photographing using a UAV further includes a step of obtaining a combined operation command, and specifically includes the following steps:

Step 1002: Acquire a photographic sample.

In some embodiments, a mobile terminal may acquire a photograph taken by a professional photographer as a photographic sample. For example, the mobile terminal may download the photographic sample from the Internet based on a search result conducted by the user of the mobile terminal using, e.g., a text message as a search term. The acquired photographic sample matches a preset automatic photographing mode. The photographic sample includes at least one of a picture sample and a video sample.

Step 1004: Quantify a photographing location parameter and a photographing parameter from the photographic sample.

Specifically, the photographing location parameter may be quantified according to a location and a deformation of an article in the photographic sample. The photographing location parameter is a parameter for representing a location of a photographing apparatus that photographs the photographic sample, for example, a parameter representing side-view photographing, a parameter representing top-view photographing, and a parameter representing bottom-view photographing.

For a building target or a portrait target in the photographic sample, locations and deformations of a target in side-view photographing, top-view photographing, and bottom-view photographing have differences. The photographing location parameter may be quantified by using the differences. For a video sample, a series of sequential photographing location parameters may be quantified by tracking the movement of an article. Errors may exist between the quantified photographing location parameters and actual locations of the photographing apparatus.

The photographic sample photographed by the professional photographer may directly carry a photographing parameter. The mobile terminal may directly use the carried photographing parameter as a quantified photographing parameter. If the photographic sample does not carry a photographing parameter, elements forming the photographic sample may be analyzed, so as to quantify the photographing parameter according to a combination of elements. For example, a relatively small aperture value and a relatively small focal length are generally used for a photographic sample having landscape elements. A relatively large aperture value and a medium focal length are generally used for a photographic sample having portrait elements. A relatively fast shutter speed and relatively low sensitivity to light are generally used for a photographic sample having elements with sufficient light. A relatively slow shutter speed and relatively high sensitivity to light are generally used for a photographic sample having elements with insufficient light. A relatively fast shutter speed, a relatively large aperture value, and relatively high sensitivity to light are generally used for a photographic sample having moving-article elements. A relatively slow shutter speed, a relatively small aperture value, and relatively low sensitivity to light are generally used for a photographic sample having still-article elements. By using various combinations of elements, the photographing parameter of the photographic sample may be quantified.

Step 1006: Calculate a flight parameter of the UAV according to the photographing location parameter.

Specifically, the photographing location parameter may represent a location at which the UAV takes an image. A flight trajectory of the UAV is continuous. Here, the flight parameter calculated according to the photographing location parameter may be used to control the UAV to achieve a complete flight trajectory from a starting location to a destination location via a photographing location at which photographing is performed.

Step 1008: Generate the combined operation command according to the calculated flight parameter and the quantified photographing parameter.

Specifically, the mobile terminal may generate the combined operation command according to the calculated flight parameter and the quantified photographing parameter. The generated combined operation command may be a combined operation command used to trigger a series of sequential combined actions of the UAV to accomplish automatic photographing. The calculated flight parameter here is used as the preset flight parameter when the UAV performs step 406. The quantified photographing parameter is used as the preset photographing parameter when the UAV performs step 406.

Step 1010: Associate the generated combined operation command with a corresponding preset automatic photographing mode, and store the combined operation command and the preset automatic photographing mode.

The mobile terminal associates the generated combined operation command with a preset automatic photographing mode matching the photographic sample, and stores the combined operation command and the preset automatic photographing mode. The preset automatic photographing mode here includes an automatic photographing mode with a locked target and an automatic photographing mode without a locked target.

As noted above, the combined operation command is sent to the UAV 104 for performing the predefined photographic operations. In some embodiments, the photographic sample is also sent to the UAV 104, e.g., when the user selects the automatic photographing mode with a locked target. Once arriving at the designated location, the UAV 104 first captures a picture of the target according to the photographing parameters in the combined operation command. Next the UAV 104 compares the target in the captured picture with the photographic sample. For example, a similarity measurement between the target in the captured picture and the photographic sample is measured using two-dimension correlation or other approaches known in the art. Based on the similarity measurement, the UAV 104 then adjusts its photographing location parameters or the photographing parameters or both and then captures a new picture of the target and calculates the similarity measurement repeatedly until a predefined criterion is met, e.g., the maximum of the similarity measurement is deemed to be reached. Next, the UAV 104 returns the last captured picture of the target and the corresponding photographing location parameters and photographing parameters to the mobile terminal 102. Upon receipt of such information, the mobile terminal 102 then updates the combined operation command stored in the memory accordingly. In some other embodiments, the UAV 104 returns the captured image to the mobile terminal 102 and the mobile terminal 102 then calculates the similarity measurement and the adjustments to the corresponding photographing location parameters and photographing parameters accordingly and returns the adjusted parameters to the UAV 104 to perform new image capturing operations. By doing so, the UAV 104 can conserve more power for performing other operations that have to done by the UAV 104 (e.g., flight and/or camera operations, etc.).

In this embodiment, a flight parameter and a photographing parameter that can be used to take a professional photograph may be quantified by analyzing a professional photographic sample. In this way, without needing to learn a photographing technique and a method for operating a UAV, a novice user may automatically take a professional photograph by using a UAV, so that operation convenience is improved.

Figure 11:
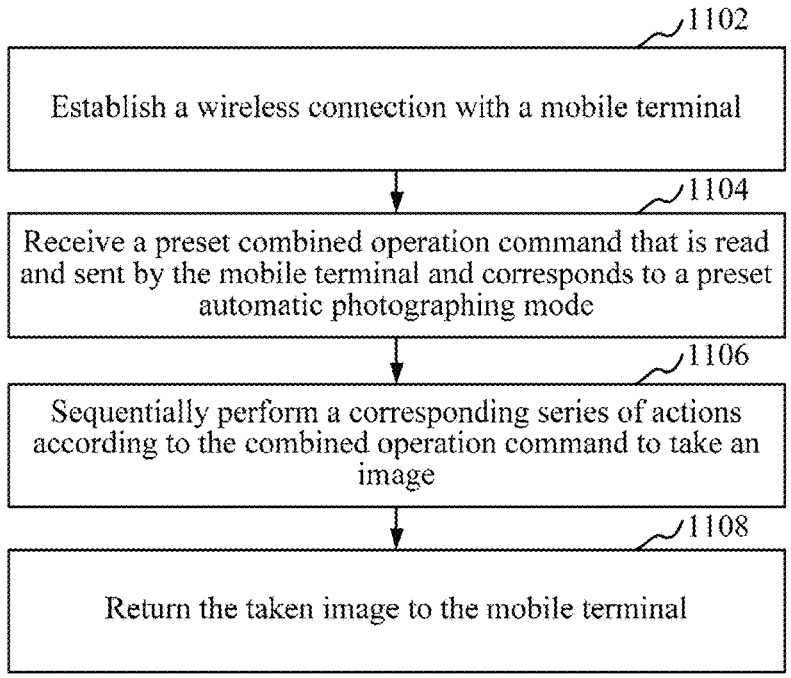
FIG. 11 is a schematic flowchart of a photographing method using a UAV in some embodiments.

As shown in FIG. 11, in some embodiments, a photographing method using a UAV is provided. This embodiment is described by using an example in which the method is applied to the UAV 104 in the foregoing FIG. 1 and FIG. 3. The method specifically includes the following steps:

Step 1102: Establish a wireless connection with a mobile terminal.

Specifically, the UAV may actively or passively establish a wireless connection with the mobile terminal. For the wireless connection, a wireless local area network connection such as a Wi-Fi connection or a WAPI connection may be used, or a normal radio connection may be used.

Step 1104: Receive a preset combined operation command that is read and sent by the mobile terminal and corresponds to a preset automatic photographing mode.

The preset automatic photographing mode is a manner of implementing a predefined automatic photographing action by using a customized parameter. In some embodiments, the preset automatic photographing mode includes an automatic photographing mode with a locked target and an automatic photographing mode without a locked target. The automatic photographing mode with a locked target is a manner of performing automatic photographing by using a locked target as a photographed object. The automatic photographing mode without a locked target may be referred to as a landscape automatic photographing mode, and is a photographing manner of performing automatic photographing without using a specific target as a photographed object.

After determining the preset automatic photographing mode, the mobile terminal acquires a photographing start command, and reads, according to the photographing start command, the preset combined operation command associated with the preset automatic photographing mode. The mobile terminal sends the combined operation command to a UAV, so that the UAV sequentially performs a corresponding series of actions according to the combined operation command to capture an image.

Step 1106: Sequentially perform a corresponding series of actions according to the combined operation command to capture an image.

Specifically, after receiving the combined operation command sent by the mobile terminal, the UAV performs the series of actions specified in the combined operation command to accomplish a task of automatically taking an image. In some embodiments, the series of actions includes at least one of a UAV flight action, a photographing view adjustment action, and a photographing parameter adjustment action.

In some embodiments, the UAV flight action includes at least one of a UAV flight-speed adjustment action, a UAV direction adjustment action, a UAV height adjustment action, a UAV hover action, a UAV roll action, and a UAV yaw action.

In some embodiments, the photographing view adjustment action includes panning and zooming of a photographing view. The photographing view is a spatial range photographed by a photographing apparatus of the UAV. Specifically, the mobile terminal may control rotation of the UAV and/or the photographing apparatus to implement panning of the photographing view, and may further move the UAV or adjust a focal length of the photographing apparatus to implement zooming of the photographing view.

In some embodiments, a photographing parameter includes at least one of sensitivity to light, an aperture value, a shutter speed, a focal length, an automatic focusing mode, a metering mode, and white balance. The automatic focusing mode includes at least one of a metering automatic focusing mode based on measurement of a distance between a lens of a photographing apparatus and a photographed target and a focusing-monitoring automatic focusing mode based on clear imaging. The metering mode includes at least one of a spot metering mode, a partial metering mode, a center-weighted average metering mode, an average metering mode, and a multi-zone metering mode.

Step 1108: Return the taken image to the mobile terminal.

Specifically, the UAV may transmit the taken image to the mobile terminal in real time by using the wireless connection, and the mobile terminal receives the image returned by the UAV, and stores the image in a preset directory. In some embodiments, the mobile terminal may receive multiple images continuously taken by the UAV, pick one image having the highest resolution, and store the image. In some embodiments, the mobile terminal may receive a series of images continuously taken by the UAV, and store the images according to a preset video format.

In the foregoing photographing method using a UAV, communication is performed with a mobile terminal by using a wireless communication manner. After determining a preset automatic photographing mode, the mobile terminal may automatically read a corresponding preset combined operation command and send the preset combined operation command to a UAV, so that the UAV may sequentially perform a series of actions according to the combined operation command to capture an image. In this way, a user does not need to directly operate a UAV to fly and perform photographing, and only needs to choose a preset automatic photographing mode, trigger and read a combined operation command corresponding to the preset automatic photographing mode, and send the combined operation command to the UAV, to enable the UAV to automatically accomplish a photographing task, so that operations are simplified, and operation convenience is improved.

Figure 12:
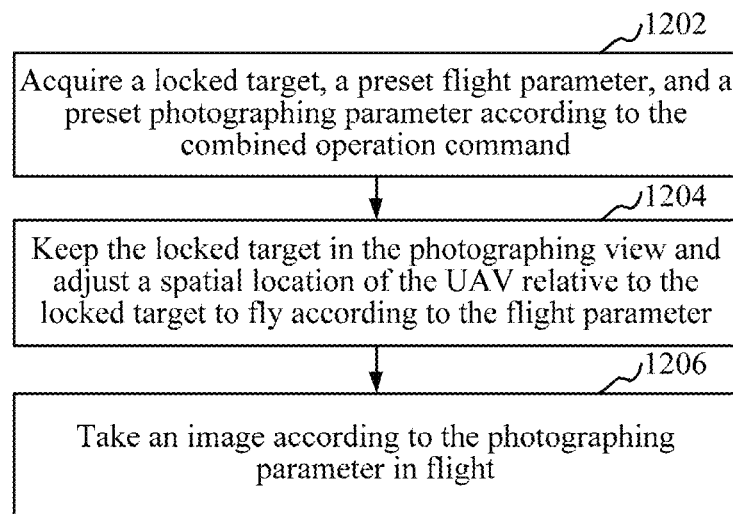
FIG. 12 is a schematic flowchart of steps of sequentially performing, when a preset automatic photographing mode is an automatic photographing mode with a locked target, a corresponding series of actions according to a combined operation command to capture an image.

As shown in FIG. 12, in some embodiments, when the preset automatic photographing mode is an automatic photographing mode with a locked target, step 1106 includes:

Step 1202: Acquire a locked target, a preset flight parameter, and a preset photographing parameter according to the combined operation command.

Specifically, the automatic photographing mode with a locked target is an automatic photographing mode in which an object to be photographed is a locked target. The locked target may be any target that can be recognized from the photographing view through image recognition, and includes at least one of a person, a building, a vehicle, a plant, and the like.

In some embodiments, when acquiring a locked target according to the combined operation command, the UAV may search the photographing view for a target, make a mark on the found target in a preview image of the photographing view, and return the preview image to the mobile terminal. The mobile terminal may display the preview image and the mark on the found target, and monitor a selection command on the displayed mark, so as to use a target corresponding to a mark selected by a selection command as the locked target and notify the UAV of the target, to enable the UAV to obtain the locked target.

In some embodiments, when acquiring a locked target according to the combined operation command, the UAV may search the photographing view for targets, and automatically determine the locked target from the found targets according to a preset strategy. For example, the UAV may determine a locked target according to a priority of a locked target, for example, preferentially use a portrait target as a locked target; or may further determine a target having the largest area as a locked target.

Step 1204: Keep the locked target in the photographing view and adjust a spatial location of the UAV relative to the locked target to fly according to the flight parameter.

Specifically, the UAV acquires the locked target, the preset flight parameter, and the preset photographing parameter according to the corresponding combined operation command. Further, the UAV keeps the locked target in the photographing view, and flies according to the acquired flight parameter, so as to adjust the spatial location relative to the locked target in flight, enabling the UAV to fly along a fixed trajectory relative to the locked target.

The flight parameter includes a change parameter of the spatial location of the UAV relative to the locked target, and may further include a flight speed parameter or a body rotation parameter. A spatial location and a flight direction of the UAV may be determined according to the change parameter of the spatial location, a flight speed of the UAV may be determined according to the flight speed parameter, and body rotation of the UAV in flight may be adjusted according to the body rotation parameter.

The UAV may specifically keep the locked target in the photographing view according to at least one of the body rotation parameter, a lens turning parameter, and a focal length adjustment parameter. The body rotation parameter is included in the flight parameter, and the lens turning parameter and the focal length adjustment parameter are included in the photographing parameter.

When adjusting the spatial location of the UAV relative to the locked target, the UAV may adjust a location of the UAV in a three-dimensional coordinate system according to the change parameter of the spatial location of the UAV relative to the locked target, so that a relationship between the location of the UAV in the three-dimensional coordinate system and a location of the locked target in the three-dimensional coordinate system meets the foregoing change parameter of the spatial location.

Step 1206: Capture an image according to the photographing parameter in flight.

Specifically, the UAV takes an image according to the photographing parameter in flight.

In the foregoing embodiment, in an automatic photographing mode with a locked target, a mobile terminal may control a UAV to use a locked target as a photographed object to automatically fly and perform photographing to obtain an image. In this way, a user does not need to learn complex techniques of operating a UAV and performing photographing to photograph an image of a specific target at a particular level, so that operations are simple, and operation convenience is improved.

Figure 13:
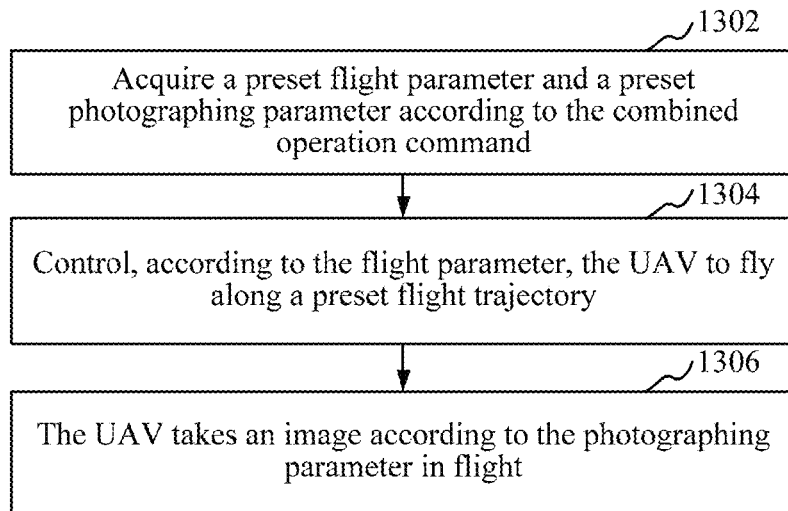
FIG. 13 is a schematic flowchart of steps of sequentially performing, when a preset automatic photographing mode is an automatic photographing mode without a locked target, a corresponding series of actions according to a combined operation command to capture an image in some embodiments.

As shown in FIG. 13, in some embodiments, when the preset automatic photographing mode is an automatic photographing mode without a locked target, step 1106 includes:

Step 1302: Acquire a preset flight parameter and a preset photographing parameter according to the combined operation command.

Step 1304: Control, according to the flight parameter, the UAV to fly along a preset flight trajectory.

The preset flight trajectory may be any predefined usable flight trajectory, for example, a closed shape or an open shape in any plane in space, for example, a closed shape such as a circle or a polygon, or may further be an open shape such as an arc and a broken line. The preset flight trajectory may further be a three-dimensional shape in space such as a spiral trajectory.

Step 1306: The UAV takes an image according to the photographing parameter in flight.

Specifically, in the automatic photographing mode without a locked target, the UAV does not use a specific target as a photographed object, but instead, is controlled by using the combined operation command to fly along the preset flight trajectory and capture an image according to the preset photographing parameter in flight. In this way, the automatic photographing mode without a locked target is particularly suitable for photographing of a landscape image.

In the foregoing embodiment, in an automatic photographing mode without a locked target, a mobile terminal may control a UAV to automatically fly along a preset flight trajectory and perform photographing to obtain an image. In this way, a user does not need to learn complex techniques of operating a UAV and performing photographing to photograph a landscape image at a particular level, so that operations are simple, and operation convenience is improved.

Figure 14:
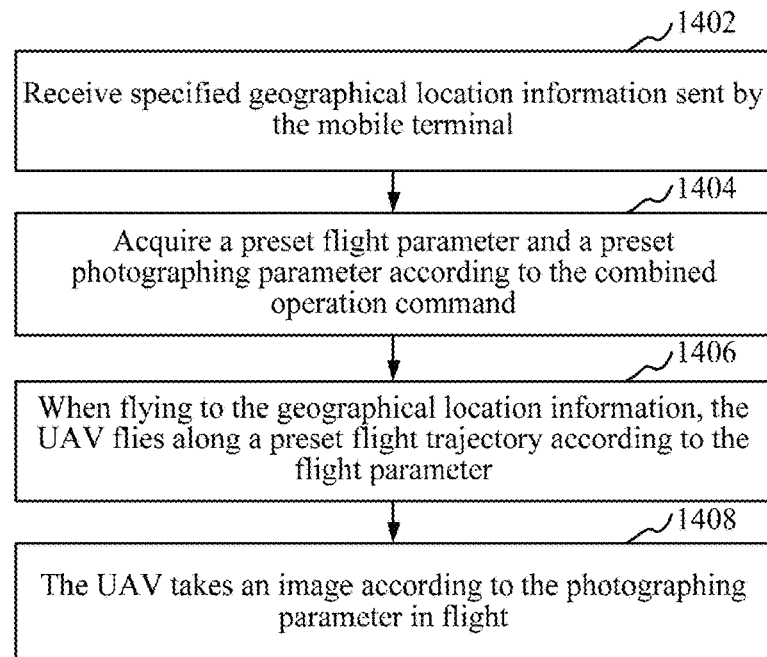
FIG. 14 is a schematic flowchart of steps of sequentially performing, when a preset automatic photographing mode is an automatic photographing mode without a locked target, a corresponding series of actions according to a combined operation command to capture an image in some embodiments.

As shown in FIG. 14, in some embodiments, when the preset automatic photographing mode is the automatic photographing mode without a locked target, step 1106 includes:

Step 1402: Receive specified geographical location information sent by the mobile terminal.

Specifically, the geographical location information is information used for representing a geographical location, where longitude and latitude are used for representation, or three-dimensional coordinates in a three-dimensional coordinate system are used for representation.

When the mobile terminal acquires specified geographical location information, the mobile terminal may specifically acquire input geographical location information as the specified geographical location information. The mobile terminal may alternatively receive a preview image transmitted in real time by the UAV and display the preview image, choose a geographical location according to an operation of the user on the geographical location in the preview image, and acquire information about the chosen geographical location as the specified geographical location information. The mobile terminal may alternatively display an electronic map of a current region of the UAV, choose a geographical location according to an operation of the user on the electronic map, and acquire information about the chosen geographical location as the specified geographical location information.

Step 1404: Acquire a preset flight parameter and a preset photographing parameter according to the combined operation command.

Step 1406: When flying to the geographical location information, the UAV flies along a preset flight trajectory according to the flight parameter.

Step 1408: The UAV takes an image according to the photographing parameter in flight.

Specifically, the UAV may acquire the specified geographical location information and current geographical location information of the UAV, and may determine a flight path of the UAV according to the two pieces of geographical location information, so that the UAV automatically flies to the specified geographical location information. Next, the UAV may fly along the preset flight trajectory under the control of the combined operation command, and capture an image according to the preset photographing parameter in flight.

In the foregoing embodiment, in an automatic photographing mode without a locked target, a mobile terminal may control a UAV to start, at a specific position, to automatically fly along a preset flight trajectory and perform photographing to obtain an image. In this way, a user does not need to learn complex techniques of operating a UAV 104 and performing photographing to photograph a landscape image at a specific position by using the UAV 104, so that operations are convenient. In addition, automatic fixed-point photographing without a locked target can further satisfy a photographing requirement of the user.

In some embodiments, the combined operation command is obtained through analysis according to a photographic sample. Specifically, a photographing location parameter and a photographing parameter are quantified from the photographic sample, a flight parameter of the UAV 104 is calculated according to the photographing location parameter, the combined operation command is generated according to the calculated flight parameter and the quantified photographing parameter, and the generated combined operation command is further associated with the corresponding preset automatic photographing mode.

In this embodiment, a flight parameter and a photographing parameter that can be used to take a professional photograph may be quantified by analyzing a professional photographic sample. In this way, without needing to learn a photographing technique and a method for operating a UAV 104, a novice user may automatically take a professional photograph by using a UAV 104, so that operation convenience is improved.

As noted above, the UAV 104 includes at least two user-controllable moving components that require user instructions from the mobile terminal 102. First, the UAV 104 itself is a moving component that can at least move up/down, left/right, and forward/backward based on user instructions. Second, the photographing apparatus of the UAV 104 (e.g., camera or video camera attached to the UAV 104) is also subject to the user control through the mobile terminal 102 in order to perform user-designated image capturing operations. The description below in connection with FIGS. 15-18 is directed to embodiments of controlling a UAV 104 and its associated camera using a graphical user interface on the mobile terminal.

Figure 15:
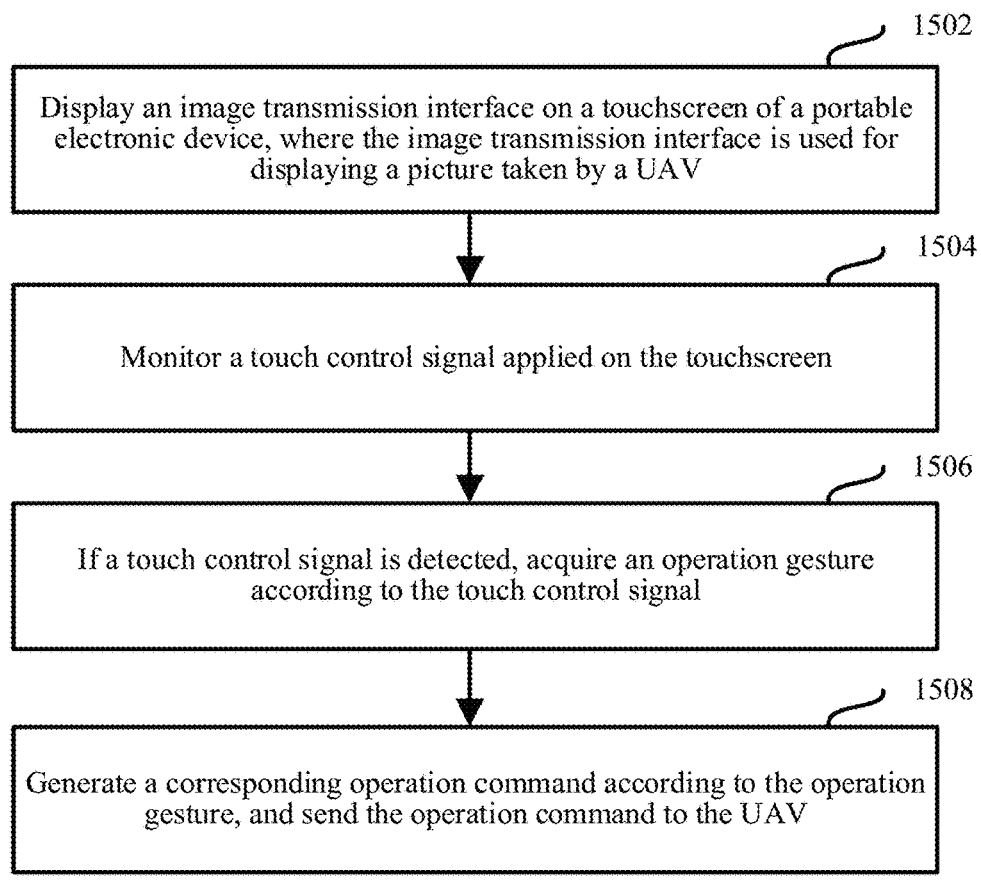
FIG. 15 is a flowchart of an interface interaction method for operating a UAV in some embodiments.

As shown in FIG. 15, in some embodiments, an interface interaction method for operating a UAV 104 and its associated camera is provided. Description is provided by using an example in which the method is applied to the mobile terminal 102 shown in FIG. 1 and FIG. 2. The method includes:

Step 1502: Display an image transmission interface on a touchscreen of the mobile terminal 102, where the image transmission interface is used for displaying a picture captured by a UAV 104.

In this embodiment, the mobile terminal may receive, in real time by using a wireless communications module, the captured picture transmitted by the UAV 104. The picture captured by the UAV 104 is displayed in real time on the image transmission interface provided by an application running in the mobile terminal.

Step 1504: Monitor a touch control signal applied on the touchscreen.

The mobile terminal has a touchscreen, and the touchscreen may be used to detect a touch control signal applied on the touchscreen. For example, a user uses a finger or a stylus to perform a click or a swipe on the touchscreen. The touchscreen may detect the touch control signal. In this embodiment, the image transmission interface and an operation interface are a same interface, that is, a touch control operation may be directly performed on the image transmission interface.

Step 1506: If a touch control signal is detected, acquire an operation gesture according to the touch control signal.

In this embodiment, the mobile terminal may monitor, by using the touchscreen, the touch control signal applied on the touchscreen, specifically, the touch control signal applied on the image transmission interface. For example, the user may make a swipe on the image transmission interface by using a single finger, or the user may make a swipe on the image transmission interface by using two fingers. According to the touch control signal applied on the image transmission interface, operation gestures may be acquired. These operation gestures include, but are not limited to, a movement gesture of a single touch point, and a movement gesture of two touch points. Different operation gestures correspond to different operation commands. Therefore, the operation gestures may be formed on the image transmission interface to operate the UAV 104 in various ways.

Step 1508: Generate a corresponding operation command according to the operation gesture, and send the operation command to the UAV 104.

Specifically, different operation gestures correspond to different operation commands. A corresponding operation command may be generated according to an operation gesture. For example, during the camera control mode, when the user uses a finger to make a swipe to the right on the image transmission interface displayed by the touchscreen, the mobile terminal 102 generates an operation command for correspondingly controlling the UAV 104 to move in the right direction; when the user uses a finger to make a swipe to the left on the image transmission interface displayed by the touchscreen, the mobile terminal 102 generates an operation command for correspondingly controlling the UAV 104 to move in the left direction; when the user uses a finger to make a swipe to the top on the image transmission interface displayed by the touchscreen, the mobile terminal 102 generates an operation command for correspondingly controlling the UAV 104 to move in the upward direction; and when the user uses a finger to make a swipe to the bottom on the image transmission interface displayed by the touchscreen, the mobile terminal 102 generates an operation command for correspondingly controlling the UAV 104 to move in the downward direction. But during the camera control mode, the same finger gestures is to be construed differently. For example, when the user uses a finger to make a swipe to the right on the image transmission interface displayed by the touchscreen, the mobile terminal 102 generates an operation command for correspondingly controlling a camera's lens to point rightward; when the user uses a finger to make a swipe to the left on the image transmission interface displayed by the touchscreen, the mobile terminal 102 generates an operation command for correspondingly controlling the UAV 104 to point leftward; when the user uses a finger to make a swipe to the top on the image transmission interface displayed by the touchscreen, the mobile terminal 102 generates an operation command for correspondingly controlling the UAV 104 to point upward; and when the user uses a finger to make a swipe to the bottom on the image transmission interface displayed by the touchscreen, the mobile terminal 102 generates an operation command for correspondingly controlling a UAV to point downward. The mobile terminal sends the operation command to the UAV 104 by using a wireless communication channel, so as to operate the UAV 104 or the camera to move accordingly. The operation command includes not only a type of movement but also a magnitude of the movement. In some embodiments, the magnitude of the UAV/camera movement is fixed per swipe. In some other embodiments, the magnitude of the UAV/camera movement is consistent with the magnitude of the finger swipe on the image transmission interface. In some embodiments, a finger swipe on the image transmission interface is split into at least two components. For example, an up-left swipe on the image transmission interface is decomposed into a left swipe and an up swipe, each trigging a corresponding command to be sent to the UAV/camera. In other words, one single swipe may cause the UAV/camera in two different directions. In some other embodiments, one of the two components is set to zero (e.g., a 30-degree up-right swipe is construed to be a right-only swipe and a 70-degree up-right swipe is construed to be an up-only swipe) such that only one corresponding command is sent to the UAV/camera.

In this embodiment, an image transmission interface is used to display a picture captured by a UAV 104, a touch control signal applied on a touchscreen is monitored, and the UAV 104 is controlled according to an operation gesture generated on the touchscreen. Because an operation interface and the image transmission interface are a same interface, at the same time when a user operates the UAV 104, the user can see, in real time, the picture captured by the UAV 104. Moreover, the UAV 104 may be operated by performing a touch control operation on the touchscreen of a mobile terminal, so that a response speed is faster, and use becomes more convenient.

In some embodiments, the step of generating a corresponding operation command according to the operation gesture includes: monitoring a current control mode; if the current control mode is an aircraft control mode, generating, according to the operation gesture, a corresponding operation command for controlling an aircraft to move; and if the current control mode is a camera control mode, generating, according to the operation gesture, a corresponding operation command for controlling a lens to rotate. In other words, the same finger operation gesture may cause different operation commands depending on which control mode the graphical user interface is currently in. By allowing the two control mode sharing the same graphical user interface and the same set of finger gestures, the mobile terminal 102 achieves the most efficient way of operating a remote UAV and its associated camera to perform the user-desired operations in a most intuitive and user-friendly manner. As it is well-known that the UAV 104 is typically powered by a rechargeable battery that has a limited capacity, such an efficient way of operating the UAV and its camera allows the mobile terminal 102 and the UAV 104 to execute according to the user instructions promptly and accurately and therefore save more power for the UAV 104 to remain in the air for a longer period of time and collecting more useful information before being recharged.

To enable the UAV 104 to change a photographing location and angle according to an operation of a user, the user may operate an aircraft and a lens of the UAV 104, including operating a moving direction of the aircraft and a rotating direction of the lens. Therefore, provided operation modes include the aircraft control mode and the camera control mode. In this embodiment, controls used to switch a current control mode are provided on a UAV-operation interface, and include a control used to switch from the current control mode to the aircraft control mode and an interface control used to switch from the current control mode to the camera control mode. The user may trigger switching of the current control mode by clicking a corresponding control or by using a swipe operation applied on a corresponding control.

Figure 16:
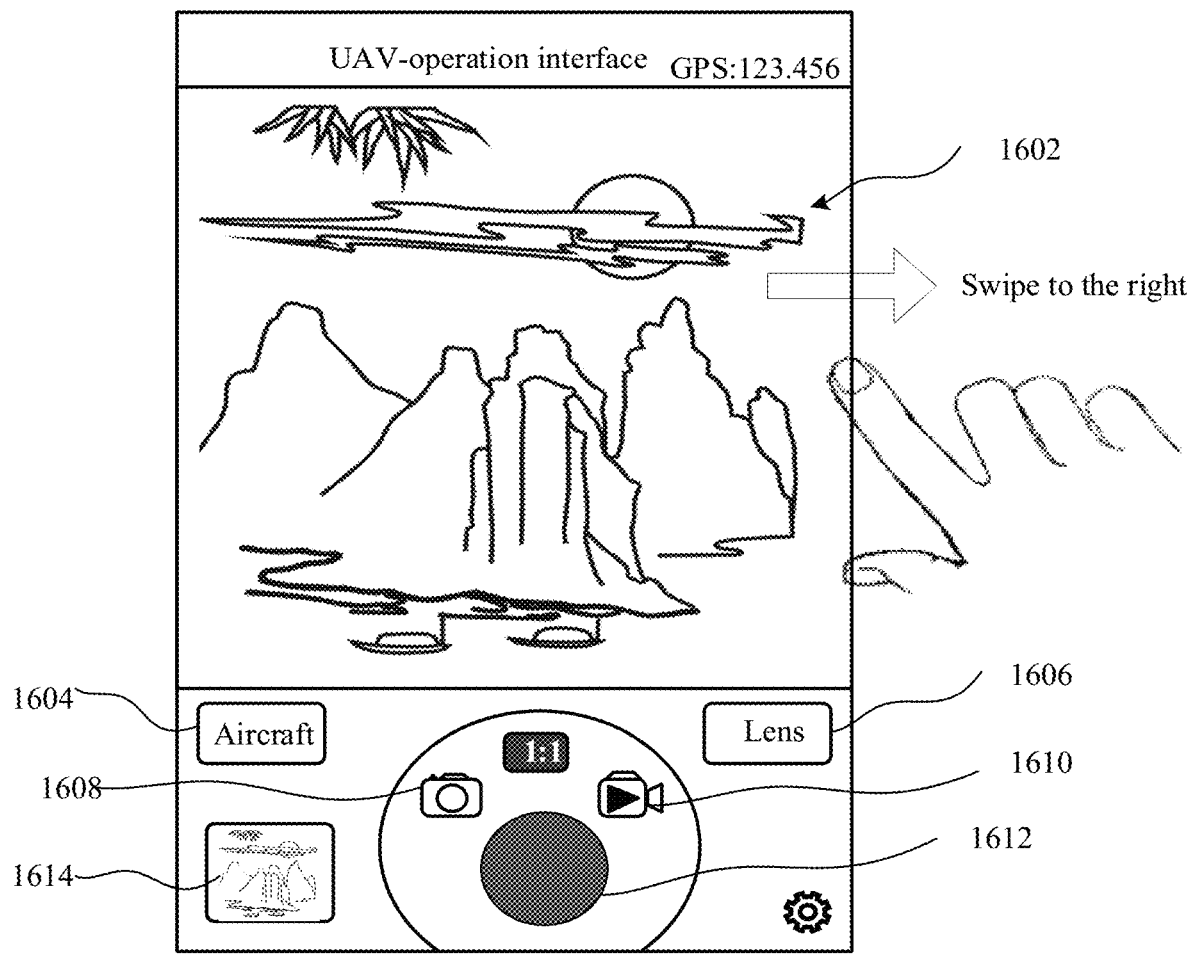
FIG. 16 is a schematic diagram of an interface for switching a control mode in some embodiments.

As shown in FIG. 16, a UAV-operation interface is provided. The UAV-operation interface includes an image transmission interface 1602. The UAV-operation interface 1602 further provides a control icon 1604 used to switch to the aircraft control mode and a control icon 1606 used to switch to the camera control mode. When the control icon 1604 is triggered, the current control mode is the aircraft control mode, and an operation gesture acquired on the image transmission interface 1602 may be used to control the movement of the aircraft. When the control icon 1606 is triggered, the current control mode is the camera control mode, and an operation gesture acquired on the image transmission interface 1602 may be used to control the rotation of the lens.

Further referring to FIG. 16, a picture captured by the UAV 104 is displayed on the UAV-operation interface in real time by using the image transmission interface 1602. The UAV-operation interface further provides some interface elements used to implement photographing and a related function. For example, the UAV-operation interface further provides a control button 1612 used to capture an image or a picture displayed in real time on the image transmission interface 1602. A mobile terminal 102 detects a click operation on the control button 1612, saves the current image or picture on the image transmission interface 1602 to a specified folder, and displays, on the UAV-operation interface, a thumbnail 1614 of a photo obtained through photographing. The thumbnail 1614 further provides a means of browsing the photo. When the thumbnail 1614 is clicked, the current photo obtained through photographing may be directly acquired from the specified folder and displayed. In addition, the UAV-operation interface provides a control 408 used to switch to a camera mode, and provides a control 1610 used to switch to a video mode.

Further, a user may use a finger to perform a touch control operation on the image transmission interface 1602 to generate the operation gesture. For example, with reference to FIG. 16, the user uses a finger to make a swipe to the right on the image transmission interface 1602, so that an operation command for controlling an aircraft to move right is generated.

In this embodiment, two control modes are set, so that the movement of the aircraft may be operated, and the rotation of the lens may be operated. In this way, the UAV 104 takes pictures from various angles, thereby achieving higher flexibility.

Further, in some embodiments, the step of generating, according to the operation gesture, a corresponding operation command for controlling an aircraft to move includes: monitoring a moving direction of a single touch point, and generating, according to the moving direction of the single touch point, an operation command for controlling an aircraft to move in a corresponding direction.

In this embodiment, when the current control mode is the aircraft control mode, the user uses one finger or stylus to generate a single touch point on the image transmission interface. Specifically, the moving direction of the single touch point includes: moving up, moving down, moving left or moving right. A generated operation command correspondingly controls an aircraft to move as follows: the aircraft moves up, the aircraft moves down, the aircraft moves left or the aircraft moves right. That is, referring to FIG. 17, when it is detected that the moving direction of the single touch point is moving up, an operation command for controlling an aircraft to move up is generated. When it is detected that the moving direction of the single touch point is moving down, an operation command for controlling an aircraft to move down is generated. When it is detected that the moving direction of the single touch point is moving left, an operation command for controlling an aircraft to move left is generated. When it is detected that the moving direction of the single touch point is moving right, an operation command for controlling an aircraft to move right is generated.

Figure 17:
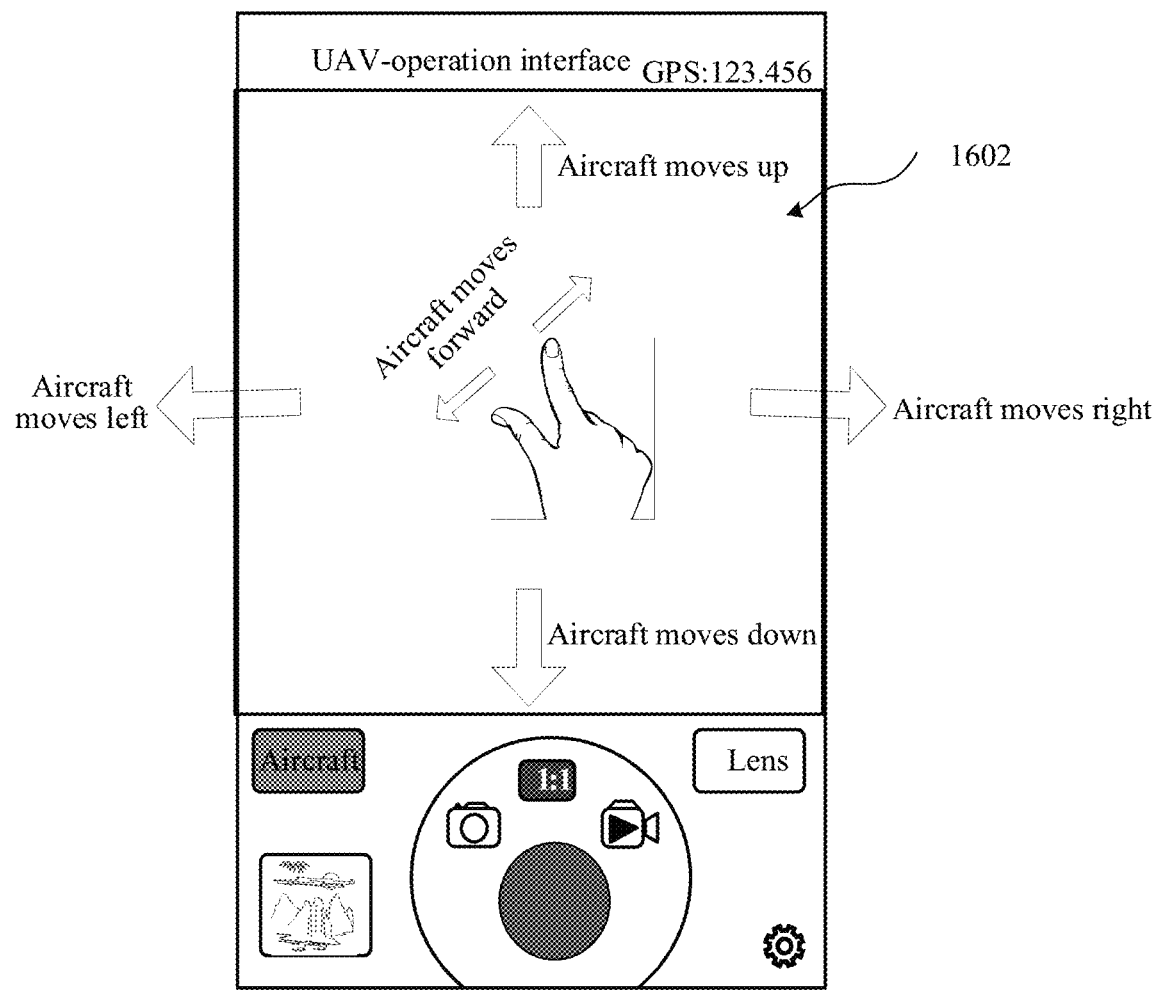
FIG. 17 is a schematic diagram of operating an aircraft in some embodiments.

It should be noted that up, down, left, and right discussed in the present application are relative terms, and are four directions up, down, left, and right generated during the use of the mobile terminal. With reference to FIG. 17, when the user uses the mobile terminal to watch an image or a picture displayed in real time on the image transmission interface 1602, the four directions up, down, left, and right can be determined. In the aircraft control mode, when the user uses a single finger or stylus to make swipes in different directions, operation commands that enable the aircraft to move in the corresponding directions are generated. It may be understood that when the mobile terminal is turned upside down, if a displayed operation interface is also turned upside down, the four directions up, down, left, and right are generated again.

In a process of controlling the UAV 104 to move in different directions, the image transmission interface 1602 displays in real time a picture captured by the UAV 104 (in FIG. 17, for ease of description of operation principles, a picture actually taken is not shown). The operation is synchronous with real-time display. The user makes a swipe up, down, left, and right on the image transmission interface 1602 to implement the movement of the aircraft in the air. This manner is similar to the manner of operating the movement of the aircraft in the real world. Therefore, a response speed is faster, and use becomes more convenient.

In some embodiments, the step of generating, according to the operation gesture, a corresponding operation command for controlling an aircraft to move includes: monitoring moving directions of two touch points; when the two touch points move away from each other, generating an operation command for controlling an aircraft to move forward; and when the two touch points move towards each other, generating an operation command for controlling an aircraft to move backward.

In this embodiment, the user may use two fingers to perform the touch control operation on the image transmission interface 1602. With reference to FIG. 17, the user uses two fingers to form two touch points on the image transmission interface 1602. When the two touch points move away from each other (that is, a distance between the two touch points increases or a de-pinch finger gesture), the UAV 104 can be controlled to move forward. In contrast, when the two touch points move towards each other (that is, a distance between the two touch points decreases or a pinch finger gesture), the UAV 104 is controlled to move backward. In this embodiment, an aircraft can be controlled to move forward and backward by using simple swipe operations of two fingers. As compared with a control manner of a virtual joystick, a response speed is faster, it is easier for a user to master the operation, and use becomes more convenient.

In some embodiments, the step of generating, according to the operation gesture, a corresponding operation command for controlling a lens to rotate includes: monitoring a moving direction of a single touch point, and generating, according to a moving direction of a single touch point, an operation command for controlling a lens to rotate in a corresponding direction.

In this embodiment, when the current control mode is the camera control mode, the user uses one finger or stylus to generate a single touch point on the image transmission interface. Specifically, a moving direction of the single touch point includes: moving up, moving down, moving left or moving right. A generated operation command correspondingly controls a lens to: pitch up, pitch down, roll left or roll right. That is, when it is detected that the moving direction of the single touch point is moving up, an operation command for controlling a lens to pitch up is generated. When it is detected that the moving direction of the single touch point is moving down, an operation command for controlling a lens to pitch down is generated. When it is detected that the moving direction of the single touch point is moving left, an operation command for controlling a lens to roll left is generated. When it is detected that the moving direction of the single touch point is moving right, an operation command for controlling a lens to roll right is generated.

Because some lenses support only pitching, therefore, in some embodiments, in the camera control mode, the moving direction of the single touch point includes: moving up or moving down. A generated operation command correspondingly controls a lens to pitch up or pitch down.

In some embodiments, in the camera control mode, in addition to the control of the pitching of the lens, the aircraft may further be controlled to move left or right. Specifically, the step of generating a corresponding operation command according to the operation gesture further includes: if the current control mode is the camera control mode, monitoring a moving direction of a single touch point; when the moving direction of the single touch point is moving vertically, generating an operation command for controlling a lens to roll in a corresponding direction; and when the moving direction of the single touch point is moving horizontally, generating an operation command for controlling an aircraft to move in a corresponding direction.

Figure 18:
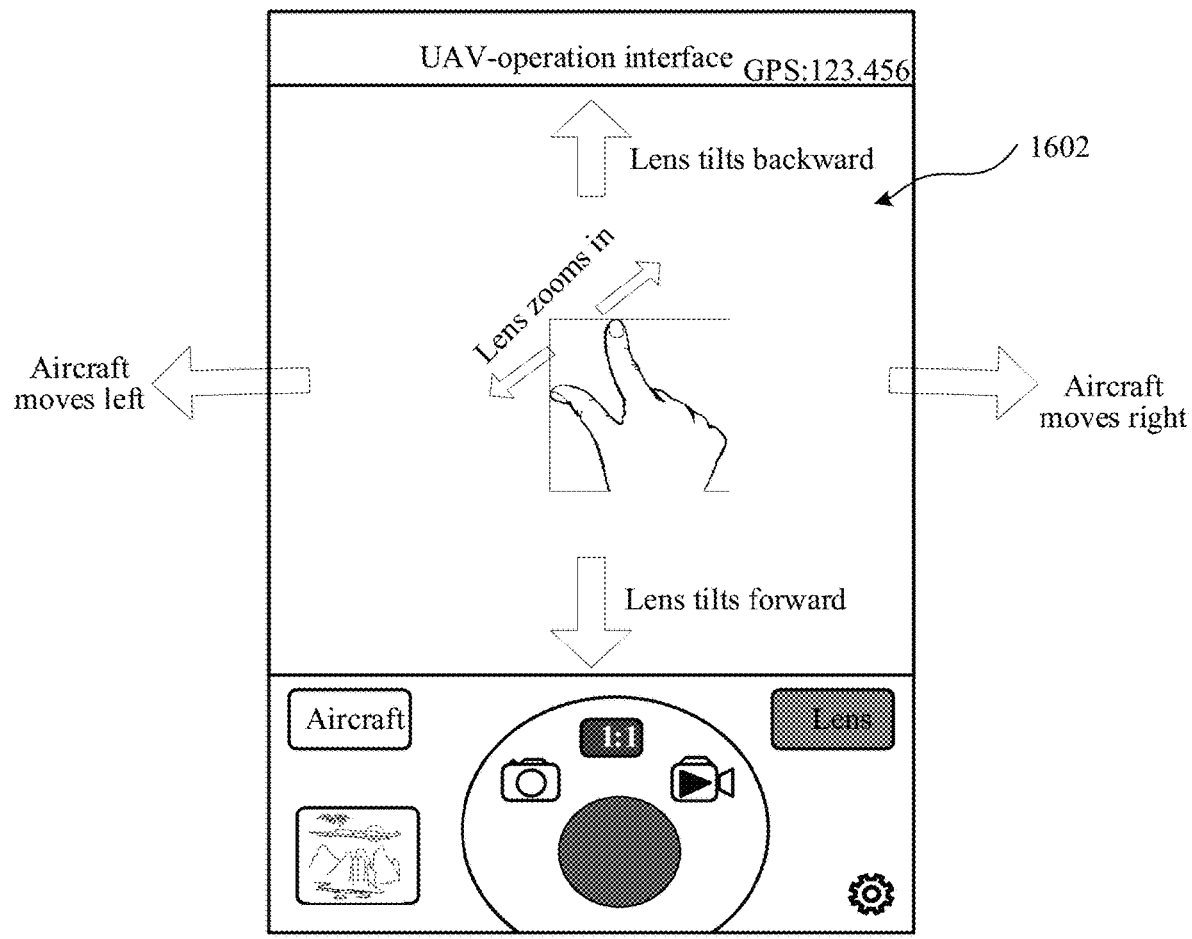
FIG. 18 is a schematic diagram of controlling a lens in some embodiments.

In this embodiment, with reference to FIG. 18, if the current control mode is the camera control mode, the user uses a single finger or stylus to perform the touch control operation on the image transmission interface 1602. A touchscreen of the mobile terminal monitors a moving direction of a single touch point. When it is detected that the moving direction of the single touch point is moving up, an operation command for controlling a lens to pitch up (tilt backward) is generated. When it is detected that the moving direction of the single touch point is moving down, an operation command for controlling a lens to pitch down (tilt forward) is generated. When it is detected that the moving direction of the single touch point is moving left, an operation command for controlling an aircraft to move left is generated. When it is detected that the moving direction of the single touch point is moving right, an operation command for controlling an aircraft to move right is generated.

In the camera control mode, the aircraft can further be operated to move left or right by making a horizontal swipe on the image transmission interface 1602. A vertical swipe can be used to operate the lens to pitch, so as to operate the UAV to perform photographing of 360-degree freedom. A swipe on the image transmission interface 1602 is used to operate an aircraft to move and a lens to rotate. As compared with an operation manner of a virtual joystick, a response speed is faster, and use by a user becomes more convenient.

In some embodiments, the step of generating a corresponding operation command according to the operation gesture further includes: monitoring moving directions of two touch points; when the two touch points move away from each other, generating an operation command for controlling a lens to increase a focal length; and when the two touch points move towards each other, generating an operation command for controlling a lens to reduce a focal length.

In this embodiment, in the camera control mode, the user may use two fingers to perform the touch control operation on the image transmission interface 1602. With reference to FIG. 18, when the two touch points move away from each other, the lens of the UAV is controlled to increase the focal length. In this way, a photographing picture displayed in real time on the image transmission interface 1602 is magnified, and the angle of view is reduced. When the two touch points move towards each other, the lens of the UAV is controlled to reduce the focal length. In this way, the photographing picture displayed in real time on the image transmission interface 1602 is shrunk, and the angle of view is increased.

In this embodiment, in a camera control mode, two fingers are used to perform a swipe operation, so that a focal length of a lens is controlled to increase or decrease. As compared with a control manner of a virtual joystick, a response speed is faster, and a user can use simple touch and swipe operations to control a photographing picture displayed in real time on an image transmission interface to be magnified or shrunk, so that use becomes more convenient.

It is well-known that the mobile terminal 102 includes many sensors for detecting its own movement and orientation information. The description below in connection with FIGS. 19-30 is directed to embodiments of controlling a UAV 104 and its associated camera using the various sensor information of the mobile terminal.

Figure 19:
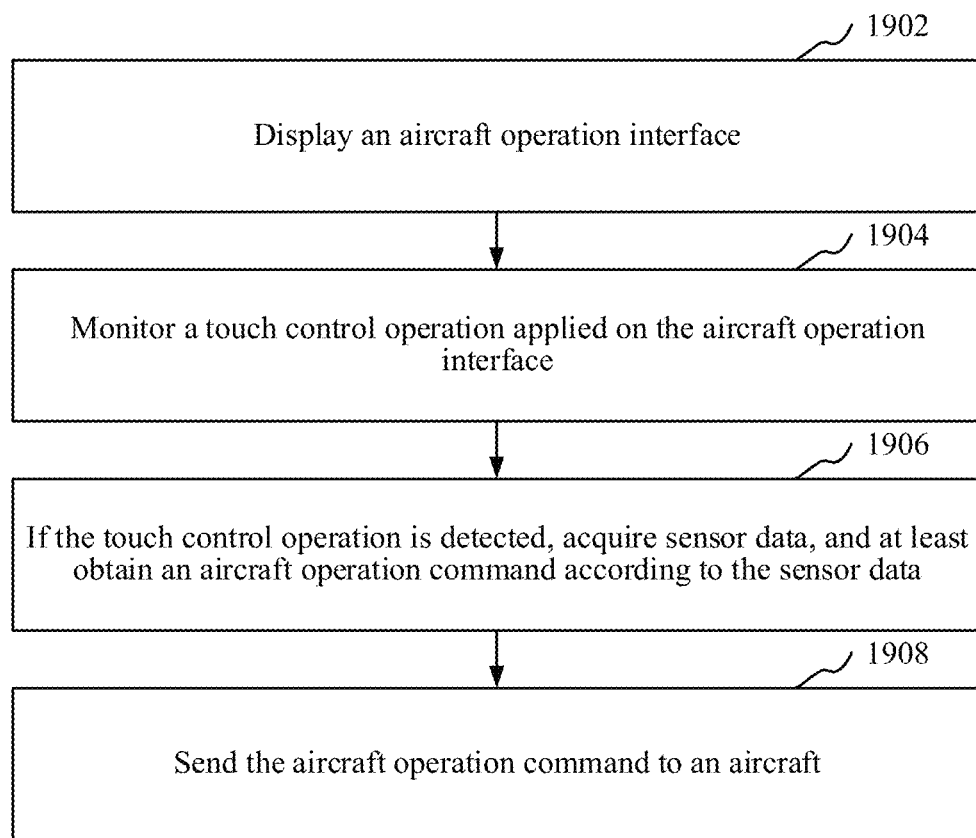
FIG. 19 is a schematic flowchart of a method for operating an aircraft in some embodiments.

As shown in FIG. 19, in some embodiments, a method for operating an aircraft like the UAV 104 is provided. This embodiment is described by using an example in which the method is applied to the mobile terminal 102 in the foregoing FIG. 1 and FIG. 2. The method includes the following steps:

Step 1902: Display an aircraft operation interface.

Specifically, an aircraft operation application is run the mobile terminal. The aircraft operation application has a function of operating an aircraft, and may further have a function of processing a photo or a video taken by an aircraft. Here, the processing on the photo or the video taken by the aircraft mainly includes categorization, presentation, sharing with a social network friend, and generation of a travel path. The mobile terminal may specifically perform sorting according to a shooting time of a photo or a video to generate a travel path, or may further sort, according to a corresponding shooting time, geographical location information recorded when the photo or the video is taken, to generate a travel path. Here, the travel path may reflect a travel path of the aircraft, or may further reflect a travel path of a user.

Figure 20:
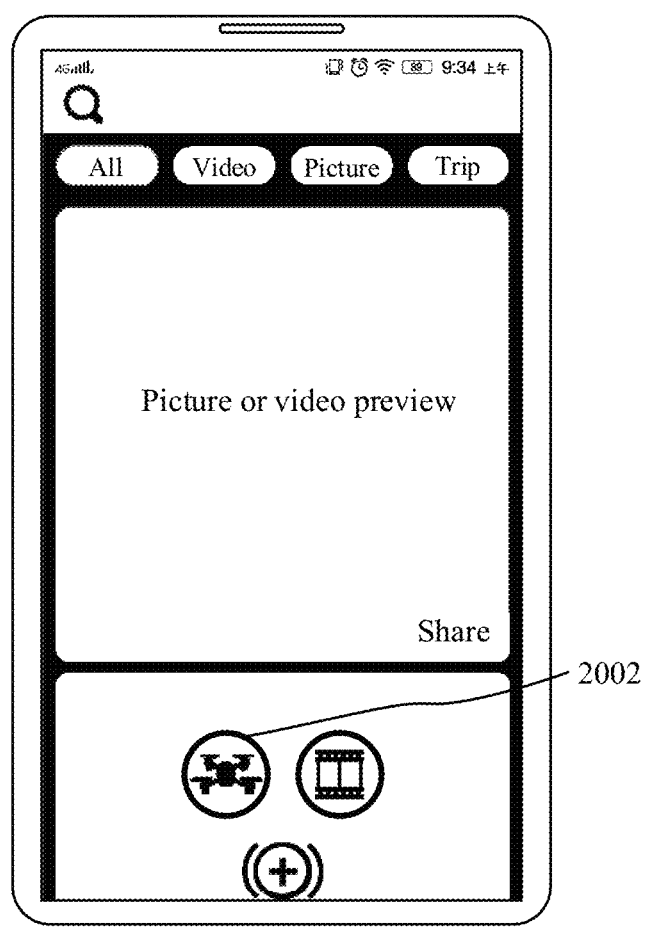
FIG. 20 is a schematic diagram of a displayed presentation page of a mobile terminal in some embodiments.

The mobile terminal uses the aircraft operation application to provide an aircraft operation interface used for triggering an aircraft operation command, and may specifically jump to the aircraft operation interface from a presentation page used for presenting a photo or video taken by an aircraft. For example, an aircraft operation application runs on a mobile terminal. A presentation page shown in FIG. 20 is entered first. A user may view, on the presentation page by category, photos or videos taken by an aircraft and share a photo or video with a social network friend. A travel path generated according to the photos or videos taken by the aircraft may further be presented. When detecting an operation on an aircraft operation icon 2002, the mobile terminal enters an aircraft operation interface shown in FIG. 21.

Step 1904: Monitor a touch control operation applied on the aircraft operation interface.

Specifically, a first touch control region is a specific region in the aircraft operation interface, and is used for supporting a touch control operation. The first touch control region may be a button. The button is in a first state by default, and changes to a second state when a touch control operation is detected. The state here includes at least one of a shape, a color, and a pattern. For example, the button is in a released state by default, and changes to a pressed state after a touch control operation is detected. The first touch control region may also be a region that is labeled by using a preset mark, for example, a region enclosed by a dotted-line box or marked by using a special color. The first touch control region may also be not marked, but instead is indicated in an instruction drawing when an aircraft operation interface is entered for the first time. The touch control operation may specifically be a tap operation, a double-tap operation, a touch-and-long-press operation, a swipe operation or a multi-touch-point control operation. The multi-touch-point control operation is an operation based on multiple touch control points. For example, multiple touch control points are triggered and the multiple touch control points converge, or multiple touch control points are triggered and the multiple touch control points diverge. When a touch control operation is applied in a first touch control region, it means that a touch control point of the touch control operation is inside the first touch control region. The mobile terminal may monitor, in real time or periodically, a touch control operation on applied on the aircraft operation interface.

Figure 21:
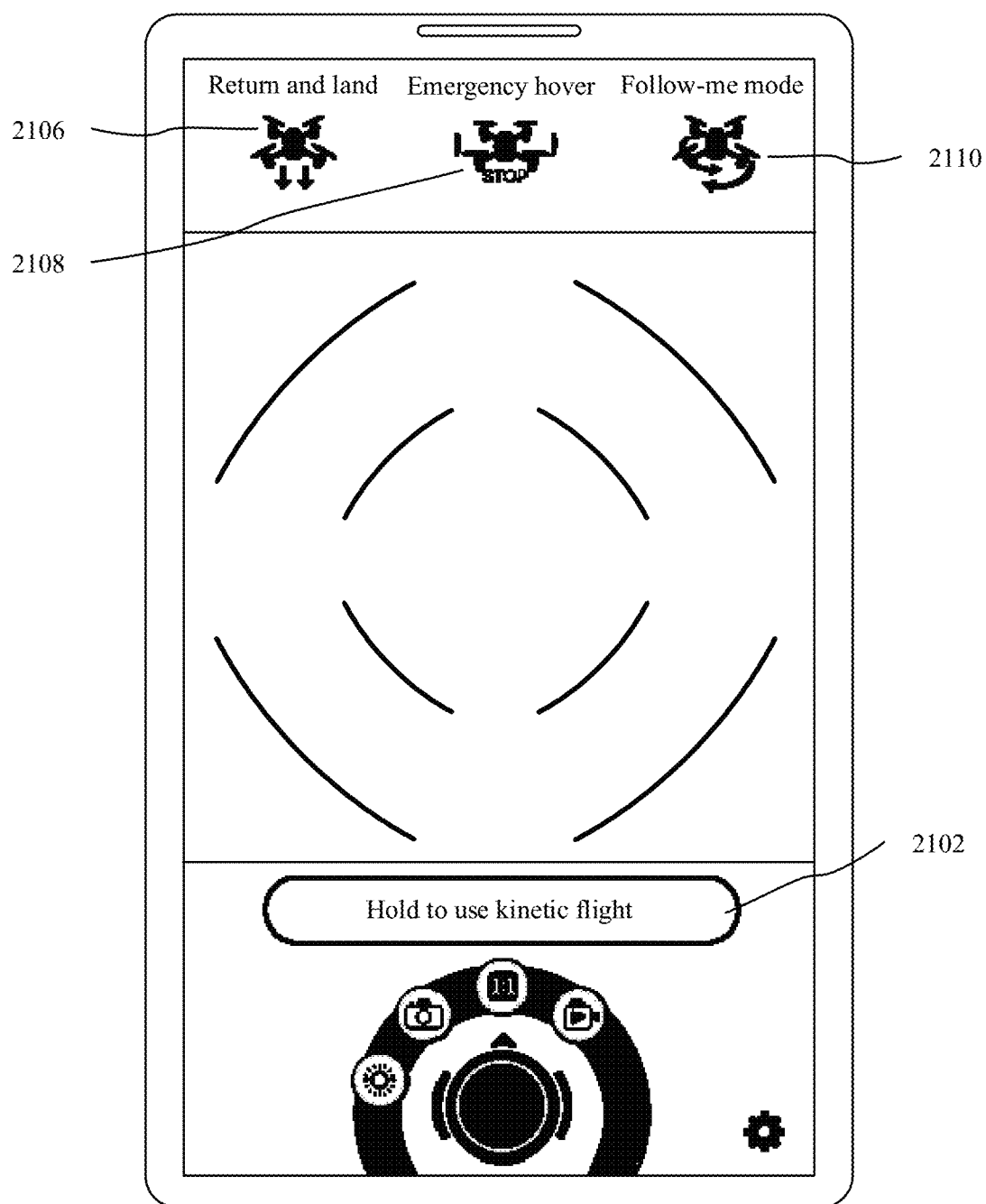
FIG. 21 is a schematic diagram of an aircraft operation interface displayed by a mobile terminal in some embodiments.

For example, referring to FIG. 21, the first touch control region may be a region 2102 located on the aircraft operation interface. The user uses a touching body to touch the first touch control region 2102 and keeps a touch control point from disappearing. The mobile terminal detects a touch control operation applied in the first touch control region 2102. The touching body is, for example, a stylus or a finger of the user.

Step 1906: If the touch control operation is detected, acquire sensor data, and at least obtain an aircraft operation command according to the sensor data.

The mobile terminal may specifically read sensor data from a corresponding sensor by using an interface for reading sensor data. The sensor data may be sensor data of multiple sensors. In some embodiments, the sensor data is from at least one of a direction sensor, a gravity sensor, an acceleration sensor, a light sensor, an electronic compass, a distance sensor, a triaxial gyroscope sensor, a temperature sensor, and a pressure sensor.

The mobile terminal may obtain an aircraft operation command according to acquired sensor data and a mapping between sensor data and an aircraft operation command. The mapping between sensor data and an aircraft operation command may be represented by using a function, where an independent variable of the function may be sensor data, and a dependent variable of the function may be an identifier of a mapped aircraft operation command.

The aircraft operation command may be an operation command for controlling a flight status of an aircraft and an attitude of the aircraft, or may be an operation command for controlling an aircraft to take a photo or a video, or may further be another command for operating an aircraft to perform an action. The flight status is, for example, at least one of a flight direction, a flight speed, a flight height, hover, a flight destination, and the like. The attitude of the aircraft is, for example, yaw, rotation or the like.

For example, if the sensor data is a pressure value from a pressure sensor, or a temperature value from a temperature sensor, or a light brightness value from a light sensor, an aircraft operation command for controlling a flight speed of an aircraft may be obtained according to the sensor data. For example, when the pressure value is larger, the aircraft flies faster, or when the temperature value is larger, the aircraft flies faster. If the sensor data is a distance value from a distance sensor, an aircraft operation command used to decelerate an aircraft when a distance value is less than a first preset value and stop the aircraft from moving forward when the distance value is less than a second preset value may be obtained according to the sensor data, where the first preset value is greater than the second preset value.

Step 1908: Send the aircraft operation command to an aircraft (e.g., the UAV 104).

Specifically, the mobile terminal sends, to the aircraft by using a wireless connection with the aircraft, the aircraft operation command obtained according to the sensor data. Therefore, after receiving the aircraft operation command, the aircraft performs an action specified in the aircraft operation command. If receiving multiple aircraft operation commands, the aircraft may sequentially perform, according to an order of receiving the aircraft operation commands, actions specified in the aircraft operation commands.

In the foregoing method for operating an aircraft, an aircraft operation interface is displayed. The aircraft operation interface has a first touch control region. If a touch control operation applied in the first touch control region is detected, an aircraft operation command is generated by using sensor data and sent to an aircraft. In this way, when a user applies a touch control operation in a first touch control region, sensor data detected by a sensor may be changed to operate an aircraft, so that a simple and brand-new operation manner is provided, the user has more options when the user operates the aircraft, and operations on the aircraft are more convenient.

In some embodiments, step 1906 includes: if a first touch control operation that is applied in a first touch control region on the aircraft operation interface and is used to enable a sensor control mode is detected, acquiring sensor data, obtaining an aircraft operation command at least according to the sensor data, and stopping acquiring sensor data when a second touch control operation applied in the first touch control region is detected.

Specifically, the touch control operation detected by the mobile terminal includes a first touch control operation used to enable a sensor control mode and a second touch control operation used to disable a sensor control mode. The sensor control mode is a mode of operating an aircraft by using sensor data. After the sensor control mode is enabled, the mobile terminal acquires sensor data, obtains an aircraft operation command at least according to the sensor data, and sends the aircraft operation command to an aircraft. After the sensor control mode is disabled, the mobile terminal no longer acquires sensor data, or no longer obtains an aircraft operation command at least according to the sensor data, or no longer sends the aircraft operation command to an aircraft, but instead, may operate the aircraft in another manner, for example, operate the aircraft by simulating a joystick.

In this embodiment, timing of entering a sensor control mode may be flexibly controlled by using a touch control operation used to enable a sensor control mode and a touch control operation used to disable a sensor control mode, so as to operate an aircraft by using a change of sensor data detected by a sensor in the sensor control mode, so that operations on the aircraft become more convenient.

In some embodiments, the first touch control operation used to enable a sensor control mode and the second touch control operation used to disable a sensor control mode may be the same. In this case, the touch control operation may be selected from a tap operation, a double-tap operation, a swipe operation, and a multi-touch-point control operation.

For example, if a tap operation in the first touch control region is detected, the sensor control mode is enabled, sensor data is further acquired, an aircraft operation command is obtained at least according to the sensor data, and the aircraft operation command is sent to the aircraft. If a tap operation in the first touch control region is detected again, the sensor control mode is disabled.

In some embodiments, the first touch control operation used to enable a sensor control mode and the second touch control operation used to disable a sensor control mode may be different. In this case, the two touch control operations may be separately selected from a tap operation, a double-tap operation, a swipe operation, and a multi-touch-point control operation.

For example, if a tap operation in the first touch control region is detected, the sensor control mode is enabled, sensor data is further acquired, an aircraft operation command is obtained at least according to the sensor data, and the aircraft operation command is sent to the aircraft. If a double-tap operation in the first touch control region is detected, the sensor control mode is disabled.

In some embodiments, the first touch control operation used to enable a sensor control mode and the second touch control operation used to disable a sensor control mode may be included in one combined touch control operation. The combined touch control operation is, for example, a touch-and-long-press operation, including a touch control operation for triggering a touch-and-long-press operation and a touch control operation for releasing a touch-and-long-press operation.

In some embodiments, step 1906 includes: starting to measure a time when a third touch control operation is detected, and if a measured time reaches preset duration and the third touch control operation is kept being applied in the first touch control region on the aircraft operation interface, acquiring sensor data, obtaining an aircraft operation command at least according to the sensor data, and stopping acquiring sensor data until the third touch control operation.

Specifically, in this embodiment, the detected third touch control operation is a continuous touch control operation. After detecting the third touch control operation, the mobile terminal acquires sensor data in a period when the third touch control operation is applied in the first touch control region, obtains an aircraft operation command at least according to the sensor data, and sends the aircraft operation command to an aircraft, until application of a touch control point in the first touch control region disappears. An application time of the touch control operation is a time period starting from a moment when the touch control operation is detected to a moment when the touch control operation disappears.

The preset duration is used for differentiation of a touch operation. If a touch control point disappears within preset duration after the touch control point is detected, the touch control point is recognized as a touch operation. If a touch control point still exists after the preset duration, the touch control point is recognized as a continuous touch control operation that needs to be monitored, and a sensor control mode is entered. A time starts to be measured from a moment when a touch control point of the third touch control operation is detected and a measured time reaches preset duration. In this case, the third touch control operation is the first touch control operation used to enable a sensor control mode. If application of the touch control point in the first touch control region disappears, the third touch control operation is the second touch control operation used to disable a sensor control mode.

In this embodiment, a time starts to be measured from a moment when a touch control point is detected. If the preset duration ends and the touch control point is still kept being applied in the first touch control region, a user may be prevented from touching the first touch control region by mistake to cause the aircraft to be out of control.

In another embodiment, the mobile terminal may also acquire sensor data right after detecting a touch control operation, obtain an aircraft operation command at least according to the sensor data, and send the aircraft operation command to an aircraft, until application of the touch control point on the first touch control region disappears.

Figure 22:
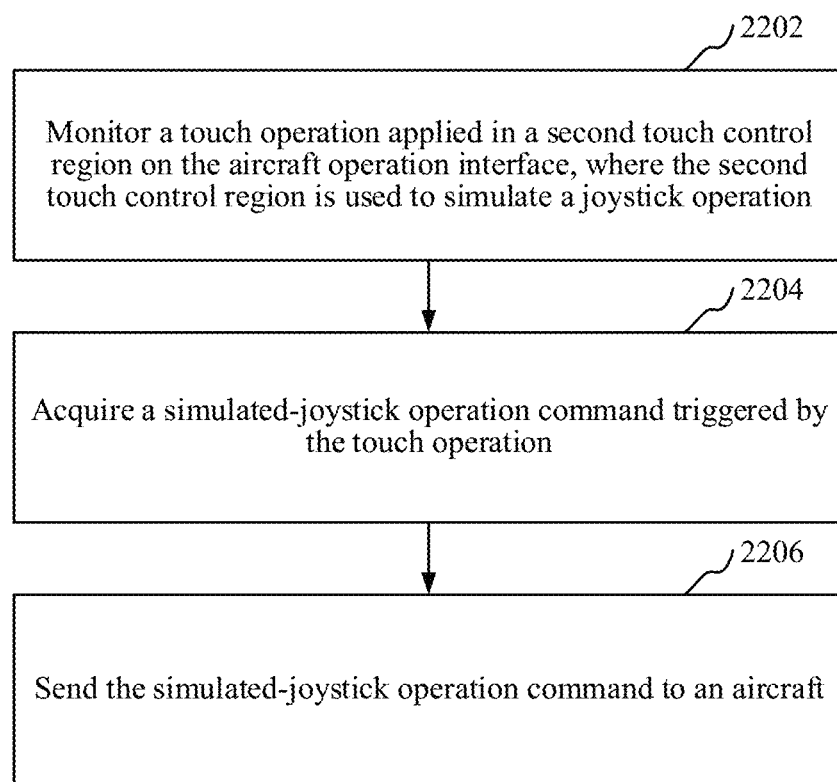
FIG. 22 is a schematic flowchart of a step of operating an aircraft according to a touch operation in a second touch control region in some embodiments.

As shown in FIG. 22, in some embodiments, the method further includes a step of operating an aircraft according to a touch operation in a second touch control region, and specifically includes the following steps:

Step 2202: Monitor a touch operation applied in a second touch control region on the aircraft operation interface, where the second touch control region is used to simulate a joystick operation.

Specifically, the second touch control region is a specific region in the aircraft operation interface, and is used for supporting a touch operation to simulate a joystick operation. The touch operation is, for example, a tap operation, a double-tap operation, a touch-and-long-press operation, a swipe operation or a multi-touch-point control operation. The touch operation applied in the second touch control region and the touch control operation applied in the first touch control region implement different operation manners.

In some embodiments, the second touch control region may surround the first touch control region. In this case, the second touch control region and the first touch control region are not overlapped. The touch operation and the detected touch control operation may be the same. In another embodiment, the second touch control region may be separate from the first touch control region.

Step 2204: Acquire a simulated-joystick operation command triggered by the touch operation.

Step 2206: Send the simulated-joystick operation command to an aircraft.

Specifically, when a touch operation is applied in different regions in the second touch control region, different simulated-joystick operation commands may be triggered. Specifically, four main directions, for example, up, down, left, and right, may be defined in the second touch control region, so that the mobile terminal may trigger, according to a relative location of a touch operation applied in the second touch control region relative to the four main directions, a corresponding simulated-joystick operation command. The simulated-joystick operation command does not conflict with the aircraft operation command. Preferably, the simulated-joystick operation command is used to operate the aircraft to move vertically and change an attitude of the aircraft. The aircraft operation command is used to operate the aircraft to move in different directions on a horizontal plane.

Figure 23:
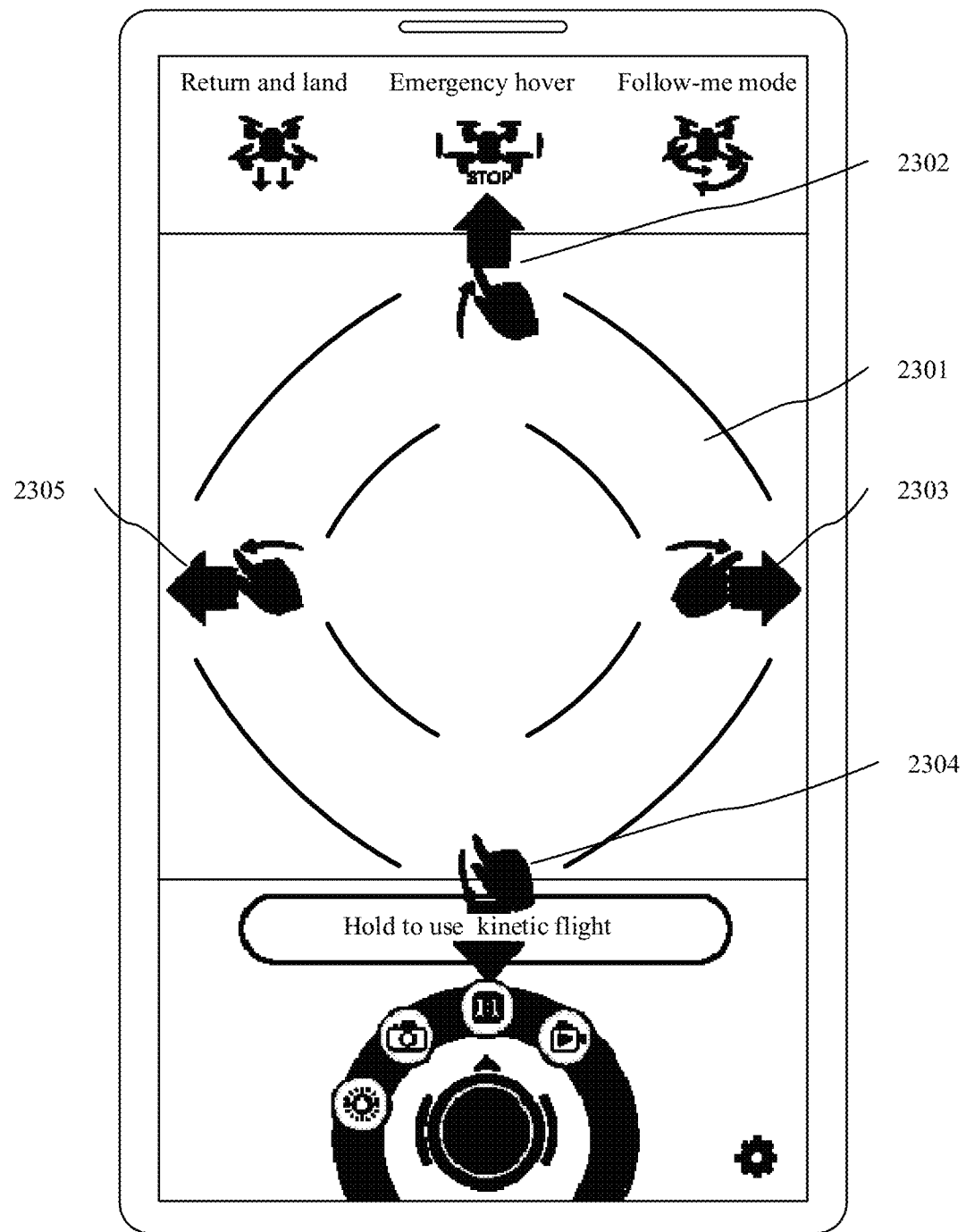
FIG. 23 is a schematic diagram of an aircraft operation interface in some embodiments.

Referring to FIG. 23, if a touch control point of a touch operation is applied in a main direction of a second touch control region 2301, for example, touch operations represented by four gestures 2302, 2303, 2304, and 2305 in FIG. 23, the mobile terminal may trigger a simulated-joystick operation command corresponding to the main direction, and send the simulated-joystick operation command to the aircraft. The aircraft may perform an action of moving up, moving down, rolling left or rolling right according to the received simulated joystick operation command.

If a touch operation is applied at a location other than the main directions in the second touch control region, the mobile terminal may trigger, according to components mapped in the main directions by a touch control point of the touch operation, a corresponding combined simulated-joystick operation command, and send the combined simulated-joystick operation command to the aircraft. The aircraft may perform, according to the received combined simulated joystick operation command, an action of rolling left and moving up, rolling right and moving up, rolling left and moving down or rolling right and moving down.

In this embodiment, a mobile terminal monitors a touch control operation applied on an aircraft operation interface, and monitors a touch operation applied in a second touch control region on the aircraft operation interface, so as to implement different operation manners of an aircraft according to different combinations of detection results. In this way, operation manners of an aircraft are diversified, and operations on the aircraft become more flexible and convenient.

In some embodiments, step 1906 includes: if it is detected that a touch control point of a fourth touch control operation is applied in a first touch control region, acquiring sensor data, obtaining an aircraft operation command at least according to the sensor data, and stopping acquiring sensor data until the touch control point disappears. The method further includes: when the touch control point moves into a second touch control region on the aircraft operation interface, triggering a simulated-joystick operation command according to a location of the touch control point in the second touch control region, and sending the simulated-joystick operation command to the aircraft. The second touch control region is used to simulate a joystick operation.

Specifically, in this embodiment, the detected fourth touch control operation is a continuous touch control operation. After detecting the fourth touch control operation, the mobile terminal acquires sensor data in an application time of a corresponding touch control point, obtains an aircraft operation command at least according to the sensor data, and sends the aircraft operation command to an aircraft, until the touch control point disappears. It is detected that the touch control point of the fourth touch control operation is applied in the first touch control region. In this case, the fourth touch control operation is the first touch control operation used to enable a sensor control mode. If the touch control point disappears, the fourth touch control operation is the second touch control operation used to disable a sensor control mode.

The mobile terminal may also start to measure a time when the touch control point of the fourth touch control operation is detected. If a measured time reaches preset duration and a corresponding touch control point is kept being applied in the first touch control region, sensor data is acquired, an aircraft operation command is obtained at least according to the sensor data, and sensor data stops being acquired until the touch control point disappears. A time starts to be measured when the touch control point of the fourth touch control operation is detected, and a measured time reaches preset duration. In this case, the fourth touch control operation is the first touch control operation used to enable a sensor control mode. If the touch control point disappears, the fourth touch control operation is the second touch control operation used to disable a sensor control mode.

Further, when the touch control point moves into a second touch control region on the aircraft operation interface, the foregoing steps 2202 to 2206 may be triggered. In this case, application of the touch control point in the second touch control region is the touch operation applied in the second touch control region.

In this embodiment, through a continuous fourth touch control operation, it may be successively triggered to enter a sensor control mode and to simulate a joystick to operate an aircraft, so that the aircraft can be operated with one hand, making operations on the aircraft more convenient.

In some embodiments, step 1906 includes: monitoring a press touch operation applied on a touch control button in a second touch control region on the aircraft operation interface, and when a press touch operation is detected, acquiring sensor data; monitoring a movement of the touch control button following the press touch operation in the second touch control region or on the aircraft operation interface, and acquiring a simulated-joystick operation command according to the movement; and obtaining the aircraft operation command according to the sensor data and the simulated-joystick operation command.

The simulated-joystick operation command is an operation command that simulates a joystick remote control. Four main directions, for example, up, down, left, and right, may be specifically defined in the second touch control region, so as to trigger, according to a relative location of a press touch operation applied in the second touch control region relative to the four main directions, a corresponding simulated-joystick operation command. The simulated-joystick operation command does not conflict with the aircraft operation command. Preferably, the simulated-joystick operation command is used to operate the aircraft to move vertically and change an attitude of the aircraft.

In this embodiment, through a press touch operation on a touch control button in a second touch control region, it may be successively triggered to enter a sensor control mode and to simulate a joystick to operate an aircraft, so that the aircraft can be operated with one hand, making operations on the aircraft more convenient.

Figure 24:
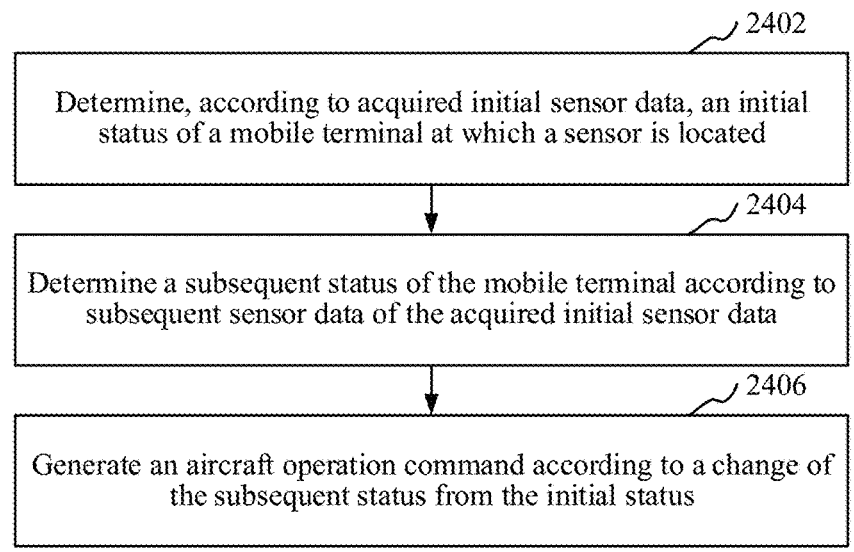
FIG. 24 is a schematic flowchart of a step of obtaining an aircraft operation command according to sensor data in some embodiments.

As shown in FIG. 24, in some embodiments, the step of obtaining an aircraft operation command at least according to the sensor data specifically includes the following steps:

Step 2102: Determine, according to acquired initial sensor data, an initial status of a mobile terminal at which a sensor is located.

Specifically, the sensor data includes data used for reflecting at least one of an attitude and a movement of the mobile terminal. The initial sensor data is sensor data initially received after the mobile terminal enters a sensor control mode, and is used to determine a current status of the mobile terminal. The current status is defined as an initial status. The initial status includes an attitude status and a movement status of the mobile terminal. The attitude status includes a tilting part, a tilting direction, a tilting angle, and the like of the mobile terminal, and the movement status includes a movement speed, a movement acceleration, a movement direction, and the like.

The mobile terminal may determine an initial status of the mobile terminal in three-dimensional space according to a three-dimensional fixed reference coordinate system of the mobile terminal. If the fixed reference coordinate system is a three-dimensional reference coordinate system and includes three axes that are perpendicular to each other, two axes may be parallel to a display screen of the mobile terminal, and the remaining axis is perpendicular to the display screen. A movement parameter includes at least one of a movement direction, a movement amplitude, and a movement speed. The initial status that is of the mobile terminal and is determined by using the fixed reference coordinate system may accurately reflect an initial status of the mobile terminal in three-dimensional space represented by the fixed reference coordinate system.

Step 2104: Determine a subsequent status of the mobile terminal according to subsequent sensor data of the acquired initial sensor data.

Specifically, after determining the initial status, the mobile terminal continues to acquire subsequent sensor data, so as to determine a subsequent status of the mobile terminal according to the subsequent sensor data. The subsequent status includes an attitude status and a movement status of the mobile terminal. The attitude status includes a tilting part, a tilting direction, a tilting angle, and the like of the mobile terminal, and the movement status includes a movement speed, a movement acceleration, a movement direction, and the like.

Step 2106: Generate the aircraft operation command according to a change of the subsequent status from the initial status.

Specifically, the mobile terminal uses an initial status as a reference to compare a subsequent status with the initial status, so as to generate an aircraft operation command according to an amount of change of the subsequent status from the initial status. For example, the initial status of the mobile terminal is that a lower left corner of the mobile terminal tilts by 15°. If a subsequent status is that the lower left corner of the mobile terminal turns to be horizontal from tilting by 15°, it is equivalent to that the lower left corner of the mobile terminal moves by 15° in an opposite direction. In this case, the mobile terminal generates an aircraft operation command according to the amount of the change. Like the previous description in connection with FIGS. 15-18, by simulating the desired movement of the UAV 104 with the user-controlled movement of the mobile terminal 102, the user can provide more intuitive instructions to the mobile terminal 102 for operating a remote UAV and its associated camera to perform the user-desired operations. As such, the UAV and its camera can be operated more promptly and accurately through the corresponding movement of the mobile terminal 102 and more battery power is saved for the UAV 104 to remain in the air for a longer period of time and collect more useful information before being recharged because less time and/or power is wasted on interpreting the user's true intent.

Figure 25:
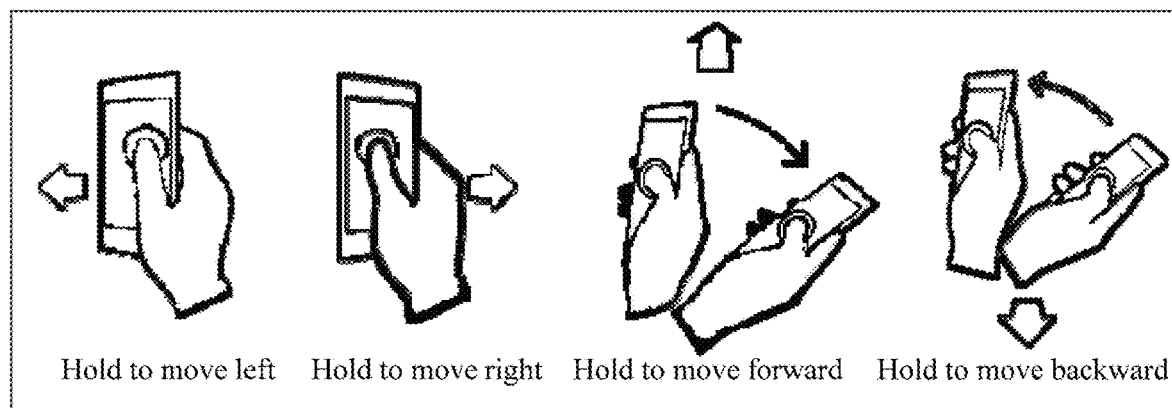
FIG. 25 is a schematic diagram of gestures of a user holding a first touch control region and shaking a mobile terminal in four main directions to operate an aircraft to perform four actions respectively in some embodiments.
Figure 26:
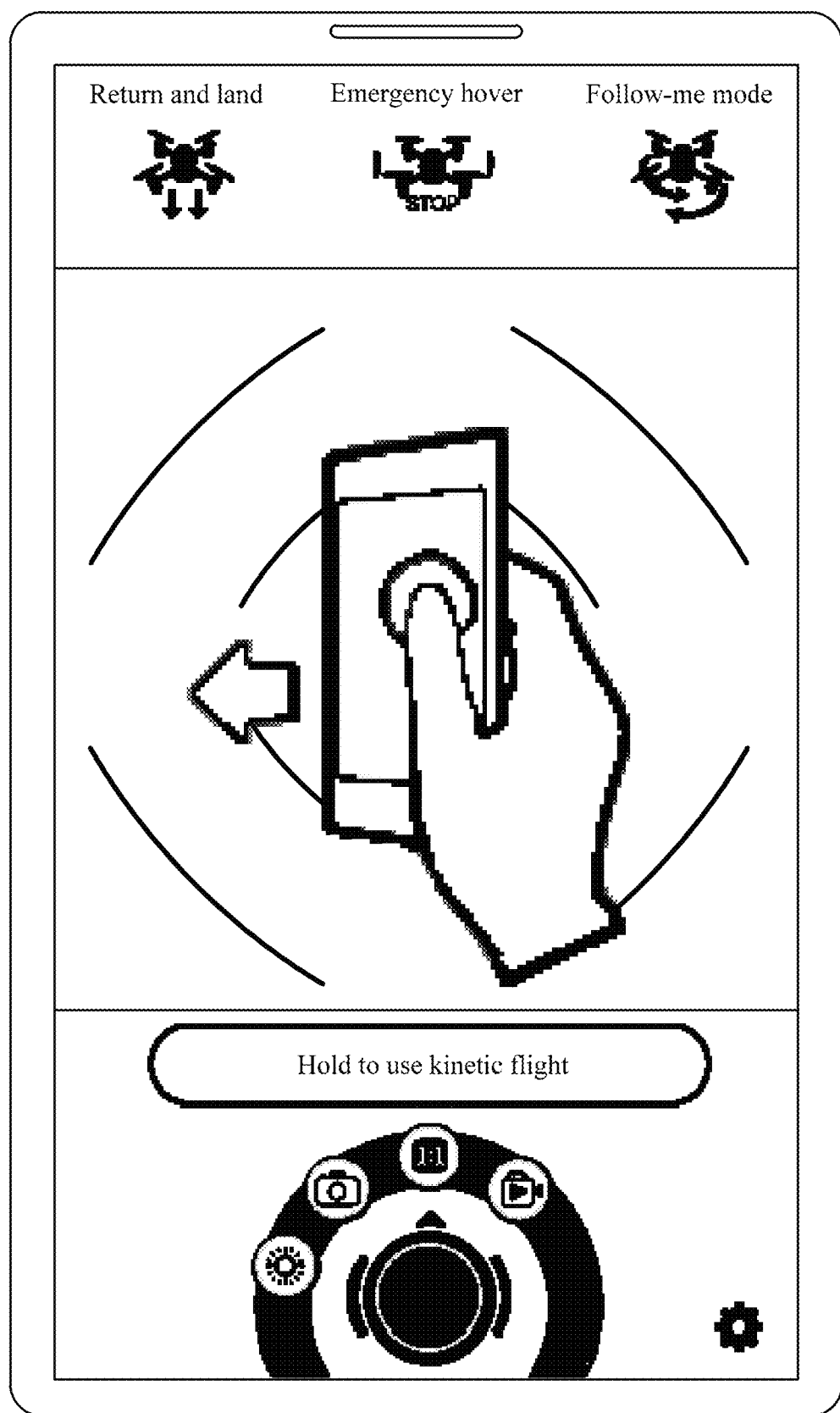
FIG. 26 is a schematic diagram of an example of a mobile terminal performing an action for a user holding a first touch control region and shaking the mobile terminal in a first direction in some embodiments.
Figure 27:
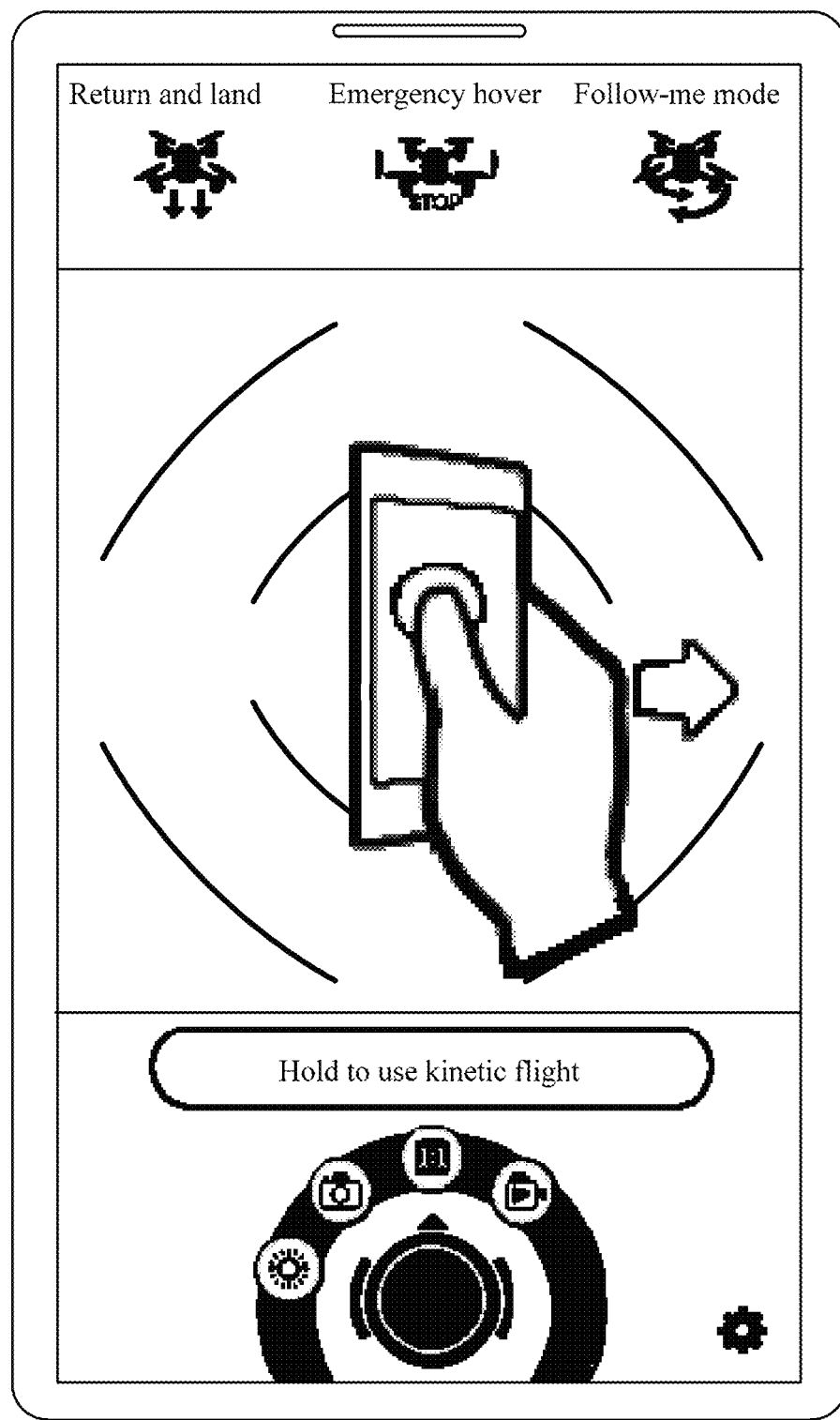
FIG. 27 is a schematic diagram of an example of a mobile terminal performing an action for a user holding a first touch control region and shaking the mobile terminal in a second direction in some embodiments.
Figure 28:
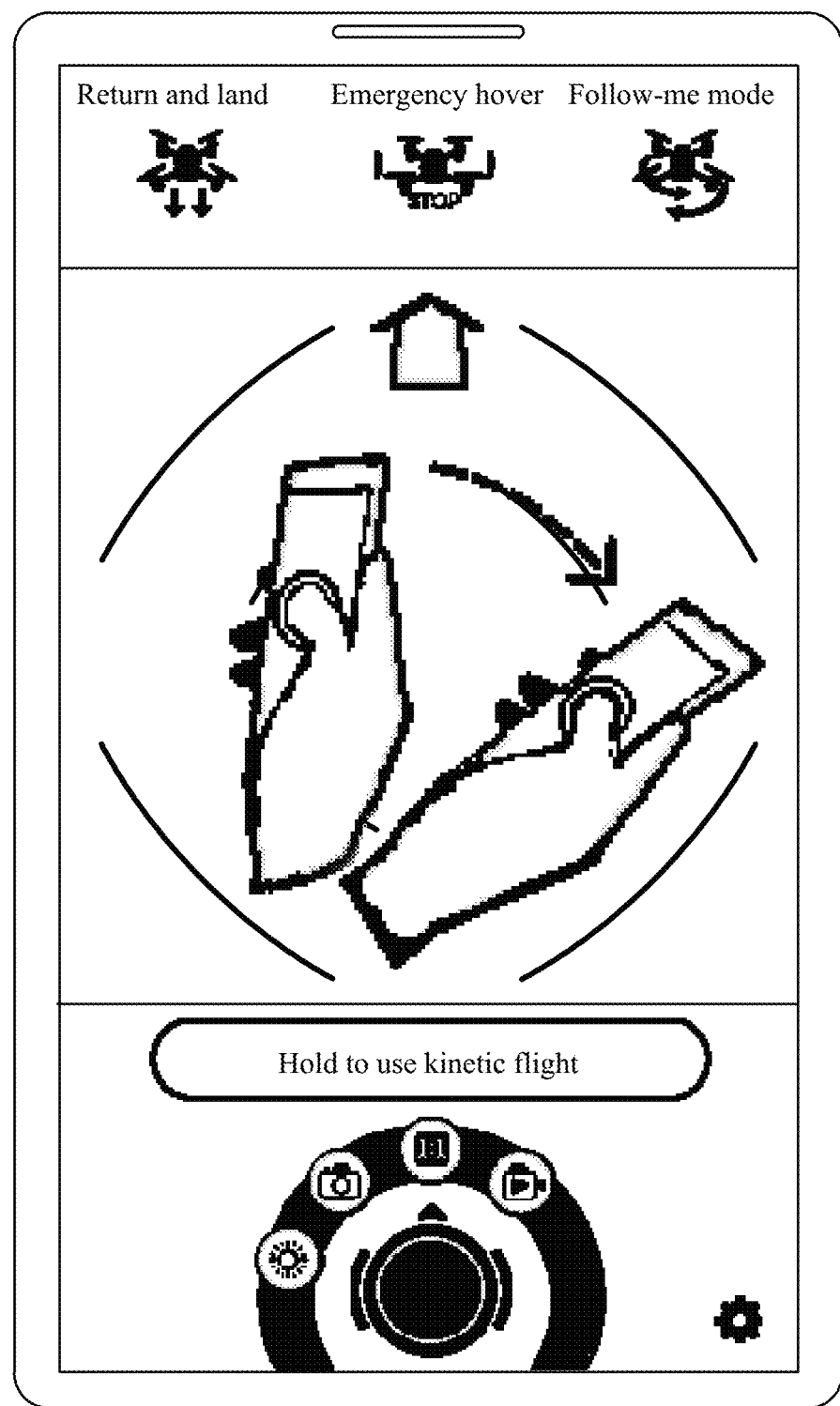
FIG. 28 is a schematic diagram of an example of a mobile terminal performing an action for a user holding a first touch control region and shaking the mobile terminal in a third direction in some embodiments.
Figure 29:
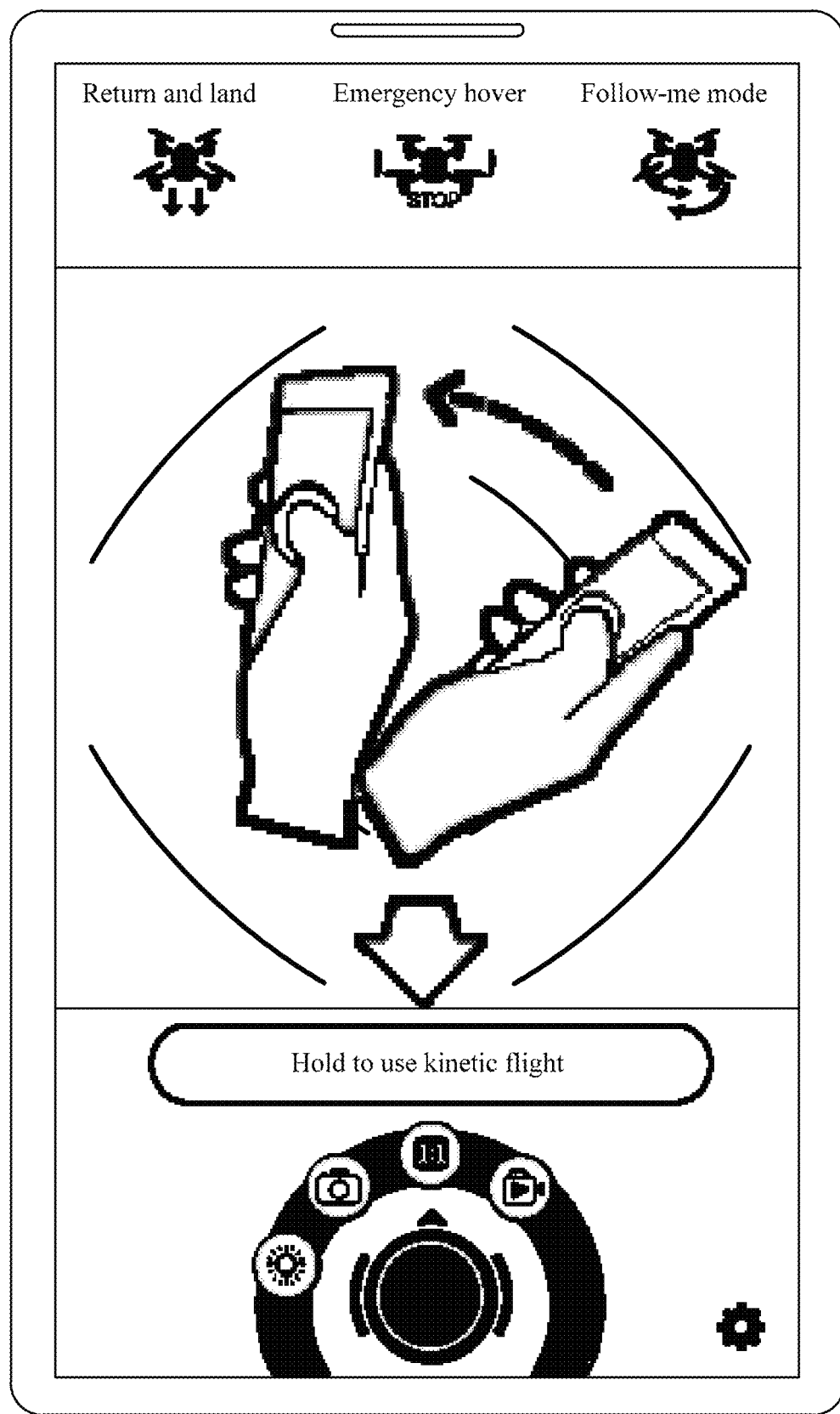
FIG. 29 is a schematic diagram of an example of a mobile terminal performing an action for a user holding a first touch control region and shaking the mobile terminal in a fourth direction in some embodiments.

For example, referring to FIG. 25 and FIG. 26 again, when the user keeps pressing a first touch control region, if the mobile terminal determines that an initial status of the mobile terminal at which the sensor is located is a horizontal state, the user shakes the mobile terminal to the left. In this case, the mobile terminal may determine a subsequent status of the mobile terminal according to the subsequent sensor data, and detect, according to a change of the subsequent status from the initial status, that the mobile terminal moves towards a left side of a screen. After the aircraft operation command generated by the mobile terminal is sent to the aircraft, the aircraft performs a corresponding action, for example, performs an action of moving left, to cause the aircraft to move along according to the mobile terminal. In some embodiments, the aircraft operation command includes not only a type of movement to be performed by the UAV but also a magnitude of the movement. The magnitude of the UAV/camera movement may be a constant value or proportional to the magnitude of the movement of the mobile terminal.

Further, when the user continues pressing the first touch control region, if the user shakes the mobile terminal rightward, upward or downward, the mobile terminal may detect that the mobile terminal moves towards a rear side, an upper side or a lower side of the screen. Correspondingly, after an aircraft operation command is sent to the aircraft, the aircraft respectively performs an action of moving right, moving forward or moving backward.

In this embodiment, a user may enable a sensor control mode by using a touch control operation in a first touch control region when a mobile terminal is in any status, and the mobile terminal performs initialization, determines an initial status according to initial sensor data, further determines a subsequent status according to subsequent sensor data, and generates an aircraft operation command according to a change of the subsequent status from the initial status. In this way, a user does not need to place a mobile terminal horizontally to operate an aircraft, so that operations become more convenient and precise.

In some embodiments, when determining the movement status of the mobile terminal, the mobile terminal determines whether the movement amplitude exceeds a preset threshold. If the movement amplitude exceeds the preset threshold, perform step 2106. If the movement amplitude does not exceed the preset threshold, skip step 2106. In this embodiment, the user may shake the mobile terminal rapidly in one direction and shake again, after the mobile terminal slowly returns to the original position, the mobile terminal in the same direction, to enable the mobile terminal to obtain consecutive movement parameters in a same direction, so as to continuously operate the aircraft to perform same actions.

Figure 30:
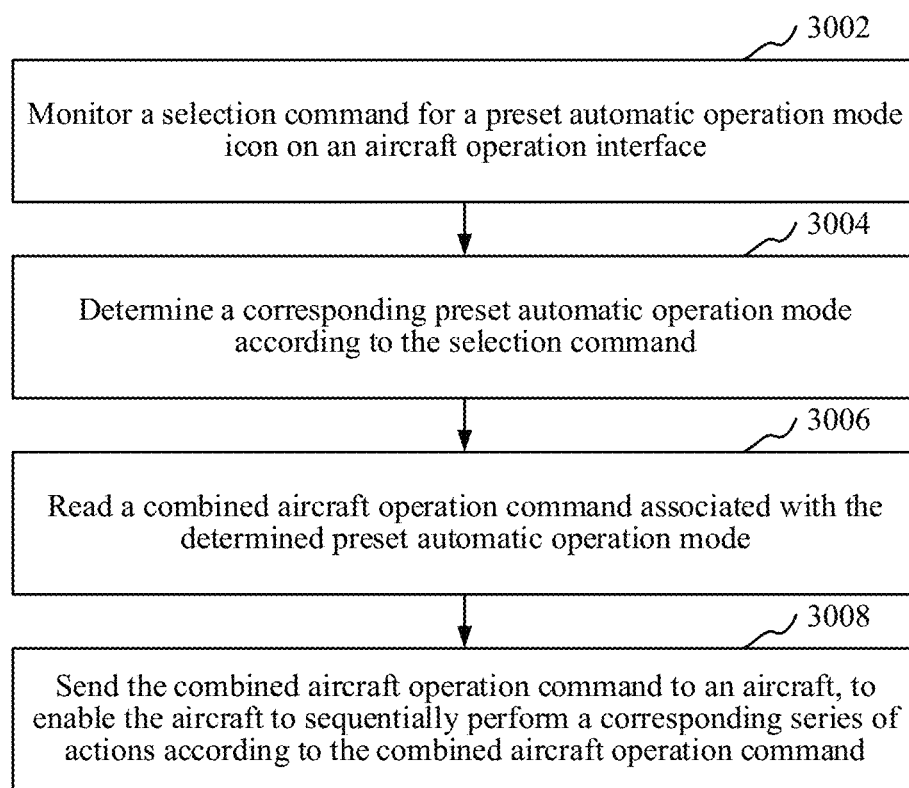
FIG. 30 is a schematic flowchart of a step of selecting a preset automatic operation mode to operate an aircraft in some embodiments.

As shown in FIG. 30, in some embodiments, the method for operating an aircraft further includes the step of selecting a preset automatic operation mode to operate an aircraft, and specifically includes the following steps:

Step 3002: Monitor a selection command for a preset automatic operation mode icon on an aircraft operation interface.

Specifically, the mobile terminal may display multiple preset automatic operation mode icons on the aircraft operation interface, for example, icons 2106, 2108, and 2110 in FIG. 21. The user clicks an icon to trigger a corresponding selection command. A preset automatic operation mode is an automatic operation manner in which a predefined parameter is used to operate an aircraft to perform a predefined action.

Step 3004: Determine a corresponding preset automatic operation mode according to the selection command.

Specifically, the mobile terminal uses a preset automatic operation mode corresponding to a preset automatic operation mode icon corresponding to a selection command as the corresponding preset automatic operation mode determined according to the selection command.

Step 3006: Read a combined aircraft operation command associated with the determined preset automatic operation mode.

Step 3008: Send the combined aircraft operation command to the aircraft, so that the aircraft sequentially performs a corresponding series of actions according to the combined aircraft operation command.

Specifically, a corresponding combined aircraft operation command is associated in advance with each preset automatic operation mode stored on the mobile terminal. After the mobile terminal reads a combined aircraft operation command and sends the combined aircraft operation command to the aircraft, the aircraft sequentially performs a series of actions according to the combined aircraft operation command, to operate the aircraft to automatically change from a current status to a target status specified in a preset automatic operation mode.

In some embodiments, the preset automatic operation mode includes at least one of a same-location landing mode, a preset-location returning and landing mode, an in-flight emergency hover mode, and a follow-locked-target flight mode.

If the determined preset automatic operation mode is the same-location landing mode, the aircraft may automatically and sequentially perform a series of actions of stopping movement in a horizontal direction, gradually reducing a flight height, reaching the ground, and stopping a rotary wing to accomplish an automatic flight task of same-location landing.

If the determined preset automatic operation mode is the preset-location returning and landing mode, the aircraft may automatically and sequentially perform a series of actions of acquiring coordinates of a preset location, flying to the coordinates of the preset location, stopping movement in a horizontal direction, gradually reducing a flight height, reaching the ground, and stopping a rotary wing to accomplish an automatic flight task of returning to a preset location to perform landing.

If the determined preset automatic operation mode is the in-flight emergency hover mode, the aircraft may automatically and sequentially perform a series of actions of stopping movement in a horizontal direction and keeping a flight height to accomplish an automatic flight task of emergency hover in flight.

If the determined preset automatic operation mode is the follow-locked-target flight mode, the aircraft may automatically and sequentially perform a series of actions of acquiring a locked target, flying to a preset distance away from the locked target, and keeping the distance to accomplish an automatic flight task of follow-locked-target flight.

In this embodiment, a user may simply operate an aircraft by using a preset automatic operation mode, to enable the aircraft to automatically accomplish a corresponding flight task, so that operation convenience is improved. A same-location landing mode, a preset-location returning and landing mode, and an in-flight emergency hover mode may be used to implement emergency avoidance or aircraft recycling. A follow-locked-target flight mode may be used to implement automatic navigation after an aircraft locks a target, so as to further achieve that one user simultaneously operates multiple aircrafts.

In some embodiments, multiple mobile terminals can communicate with the same UAV. The description below in connection with FIGS. 31-32 is directed to embodiments of having multiple mobile terminals communicating with the same UAV 104.

Figure 31:
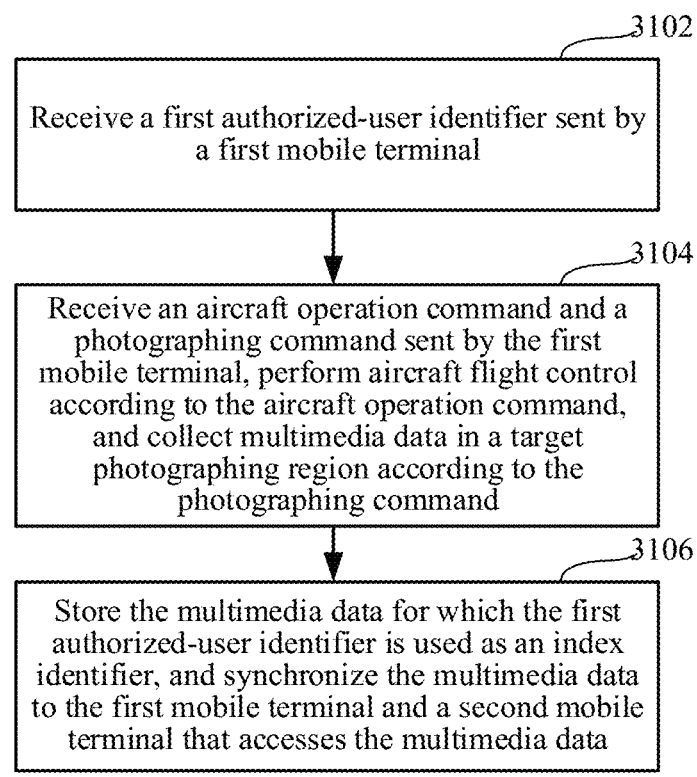
FIG. 31 is a flowchart of a multimedia synchronization method in some embodiments.

As shown in FIG. 31, in some embodiments, a multimedia synchronization method is performed by a mobile terminal 102 and a UAV 104 that is wirelessly connected to the mobile terminal 102. The method includes:

Step 3102: Receive a first authorized-user identifier sent by a first mobile terminal.

In this embodiment, the first authorized-user identifier is an authorized-user identifier agreed upon by the first mobile terminal and the aircraft. The first mobile terminal may connect to the aircraft by using the first authorized-user identifier and operate the aircraft. In some embodiments, the first mobile terminal may log in, by using the first authorized-user identifier, to an application program used for operating an aircraft. The first mobile terminal sends the first authorized-user identifier to a server by using a network for authentication. After the first authorized-user identifier is authenticated, the first mobile terminal initiates a connection signal to the aircraft. The connection signal carries the authenticated first authorized-user identifier. In another embodiment, the first mobile terminal may directly connect to the aircraft by using Wi-Fi. The first mobile terminal submits, to the aircraft, the first authorized-user identifier that is agreed upon in advance by the first mobile terminal and the aircraft, and establishes a connection with the aircraft by using the first authorized-user identifier.

Step 3104: Receive an aircraft operation command and a photographing command sent by the first mobile terminal, perform aircraft flight control according to the aircraft operation command, and collect multimedia data in a target photographing region according to the photographing command.

In this embodiment, after a connection is established between the first mobile terminal and the aircraft, an operation interface of an aircraft may be displayed on the first mobile terminal, and an operation may be performed on the operation interface to control the aircraft to perform photographing. For example, a particular operation gesture may be formed on the operation interface to control the aircraft to move left, right, forward or backward or control a lens of the aircraft to pitch or the like. A photographing button may be provided on the operation interface, and a photographing command is generated by clicking the photographing button. The first mobile terminal sends the photographing command to the aircraft. The aircraft performs photographing in a target photographing region according to the photographing command. Multimedia obtained through photographing is stored in a storage device of the aircraft. The multimedia obtained through photographing includes a video and a photo.

Step 3106: Store the multimedia data for which the first authorized-user identifier is used as an index identifier, and synchronize the multimedia data to the first mobile terminal and a second mobile terminal that accesses the multimedia data.

In this embodiment, the first mobile terminal binds an aircraft by using the first authorized-user identifier and operates the aircraft to perform photographing. Multimedia data obtained through photographing is stored by using the first authorized-user identifier as an index identifier. The multimedia data is stored by using the first authorized-user identifier as an index identifier, so that the multimedia data may be found according to the first authorized-user identifier. More specifically, the aircraft may store multimedia data in a storage device by using the first authorized-user identifier as an index identifier. It may be understood that, multimedia data of multiple first authorized-user identifiers may be stored in the storage device of the aircraft, and each first authorized-user identifier is used as an index identifier to store multimedia data corresponding to the first authorized-user identifier at a different storage location in the storage device.

Further, in some embodiments, the step of storing the multimedia data for which the first authorized-user identifier is used as an index identifier includes: establishing a corresponding unique index for each piece of multimedia data obtained through photographing, and establishing a media database for the first authorized-user identifier. The media database stores the multimedia data for which the first authorized-user identifier is used as an index identifier and the corresponding index. Specifically, the aircraft may establish, for one piece of multimedia obtained through photographing each time, an index corresponding to the one piece of multimedia. Each piece of multimedia has a unique index. In this way, each piece of multimedia data obtained through photographing may be found by using an index. An index of multimedia includes, but is not limited to, a unique sequence number or a result obtained by performing particular transformation (for example, 1000 is added before a sequence number) on a unique sequence number or a result obtained by performing particular algorithm processing on a unique sequence number.

In this embodiment, a first mobile terminal connects to an aircraft by using a first authorized-user identifier and operates the aircraft to collect multimedia data in a target photographing region. The aircraft stores the multimedia data for which the first authorized-user identifier is used as an index identifier, and may synchronize the multimedia data to the first mobile terminal and a second mobile terminal that accesses the multimedia data, so that multimedia can be flexibly synchronized between an aircraft and different multiple mobile terminals.

Further, in some embodiments, the step of synchronizing the multimedia data to the first mobile terminal includes: generating a thumbnail corresponding to the multimedia data for which the first authorized-user identifier is used as an index identifier; sending the thumbnail in real time to the first mobile terminal that currently operates an aircraft; receiving a real-time viewing command of the first mobile terminal for the thumbnail; and searching for the multimedia data corresponding to the thumbnail according to the real-time viewing command, and synchronizing the multimedia data to the first mobile terminal.

In this embodiment, the first mobile terminal sends an operation command to the aircraft, and may control, according to the operation command, the aircraft to fly, for example, to operate the aircraft to move left or right or a lens to pitch or the like. The first mobile terminal may further send a photographing command to the aircraft, for example, initiate a photographing command by using a photographing button provided on an application interface on the first mobile terminal. The aircraft performs photographing according to the photographing command to obtain multimedia data, generates a thumbnail corresponding to the multimedia data, and may send the thumbnail in real time to the first mobile terminal to display the thumbnail. Further, the first mobile terminal may receive a real-time viewing command of a user for the displayed thumbnail and send the real-time viewing command to the aircraft. The aircraft searches for the multimedia data corresponding to the thumbnail according to the real-time viewing command and synchronizes the multimedia data to the first mobile terminal. It may be understood that, when the thumbnail is sent to the first mobile terminal, an index corresponding to the multimedia may be sent together to the first mobile terminal.

Further, in some embodiments, the step of synchronizing the multimedia data to a second mobile terminal that accesses the multimedia data includes: receiving a multimedia viewing command sent by the second mobile terminal, where the multimedia viewing command carries the first authorized-user identifier; and after the first authorized-user identifier is authenticated, searching for multimedia data by using the first authorized-user identifier as an index identifier, and synchronizing the multimedia data to the second mobile terminal.

In this embodiment, during operation of the aircraft by the first mobile terminal, the second mobile terminal may access the multimedia data stored in the aircraft. Specifically, the second mobile terminal sends a multimedia viewing command to the aircraft, where the multimedia viewing command carries the first authorized-user identifier. The aircraft receives the multimedia viewing command sent by the second mobile terminal, and finds the stored multimedia data by using the first authorized-user identifier as an index identifier. More specifically, an application program may be run on the second mobile terminal. The first authorized-user identifier is submitted by using the application program. The first authorized-user identifier is sent to the server by using a network for authentication. After the first authorized-user identifier is authenticated, the multimedia viewing command that carries the first authorized-user identifier is sent to the aircraft. Alternatively, the first authorized-user identifier is an authorized-user identifier agreed upon in advance by the aircraft. The second mobile terminal may directly submit the first authorized-user identifier to the aircraft to view the stored multimedia data. Further, the aircraft may generate a thumbnail of multimedia and an index of each piece of multimedia and correspondingly send the thumbnail of multimedia and the index of each piece of multimedia to the second mobile terminal. After receiving the thumbnail and the corresponding index, the first mobile terminal displays the thumbnail.

Figure 32A:
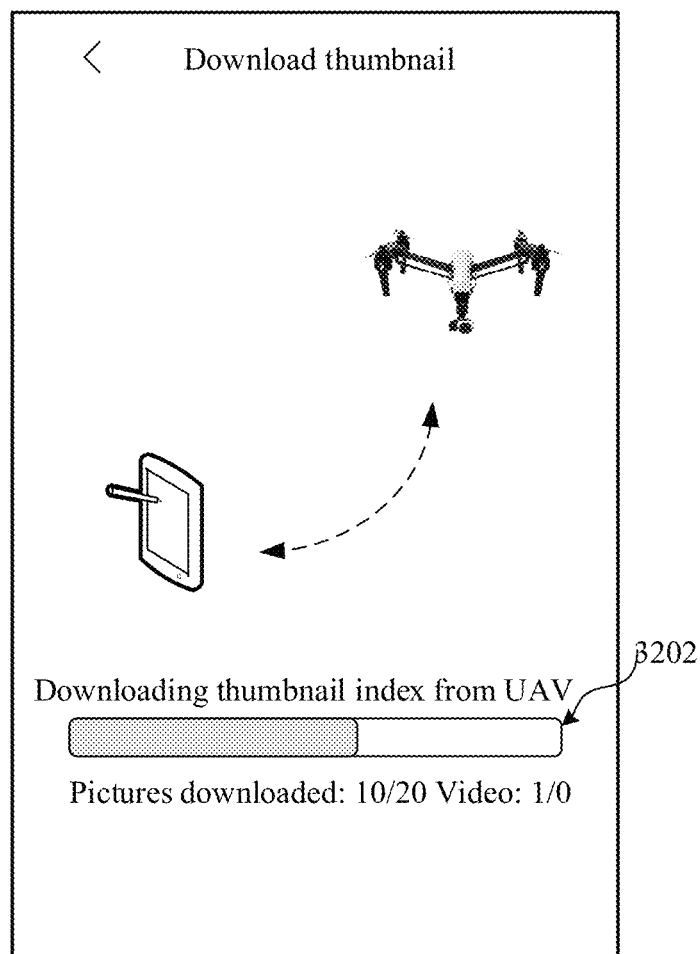
FIG. 32A is a schematic diagram of an interface for downloading a thumbnail in some embodiments.
Figure 32B:
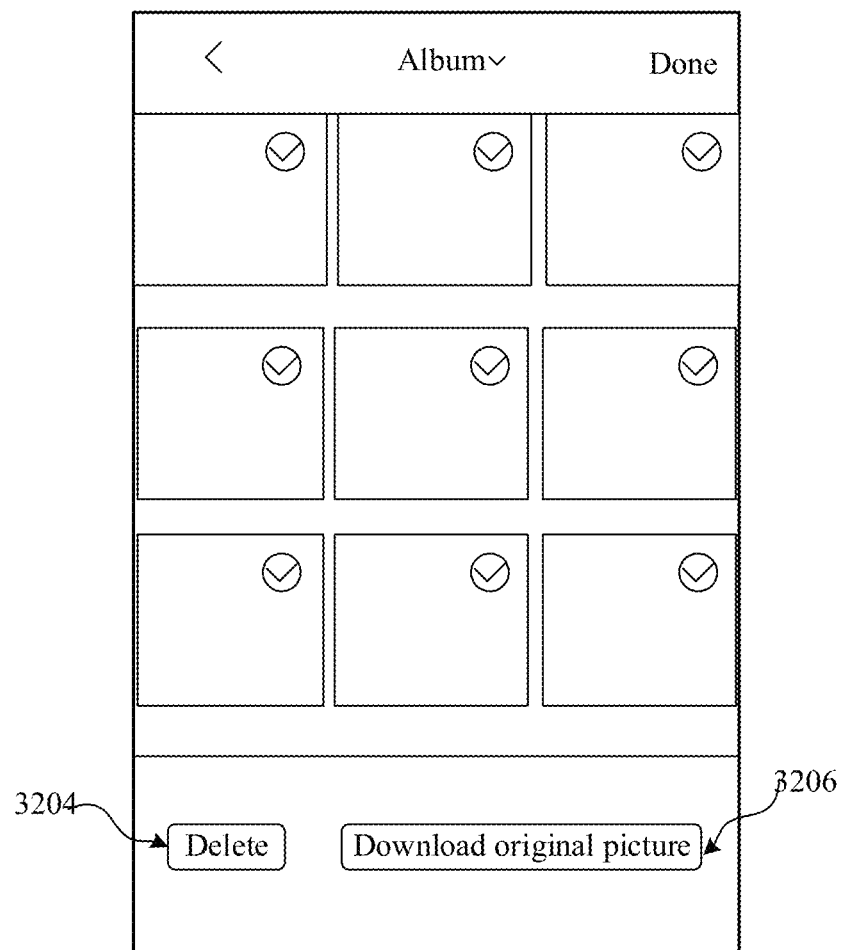
FIG. 32B is a schematic diagram of an interface for displaying a thumbnail in some embodiments.
Figure 32C:
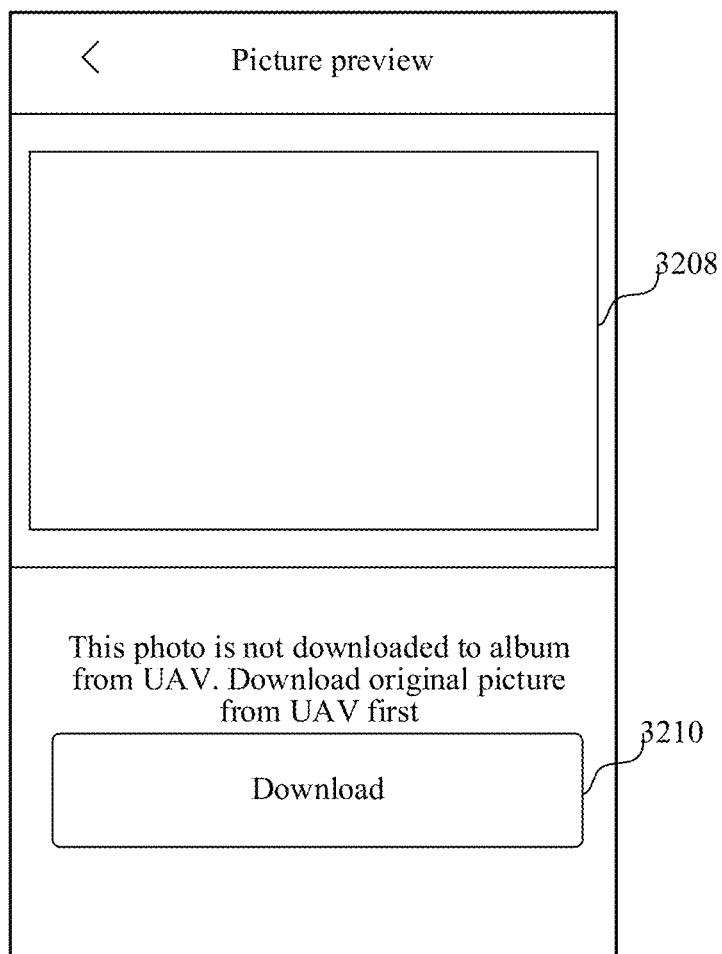
FIG. 32C is a schematic diagram of an interface for providing a preview of a thumbnail in some embodiments.

As shown in FIG. 32A, during operation of the aircraft by the first mobile terminal, the second mobile terminal may download a thumbnail and a corresponding index from the aircraft. During downloading, a progress bar 3202 may further be used to display a download progress. As shown in FIG. 32B, the second mobile terminal may display a downloaded thumbnail. A delete button 3204 and an original-picture download button 3206 are further provided on an interface for displaying a thumbnail. With reference to FIG. 32C, each thumbnail may further be viewed after the thumbnail is clicked. A thumbnail 3208 is displayed in a detailed viewing interface of the thumbnail. A download button 3210 is further provided on the detailed viewing interface. A download command for downloading original multimedia data corresponding to the thumbnail 3208 is generated by clicking the download button.

During operation of the aircraft by the first mobile terminal, the second mobile terminal may access multimedia data collected by the aircraft operated by the first mobile terminal, so that multimedia can be synchronized between multiple mobile terminals and the aircraft.

Further, in some embodiments, a download command sent by the second mobile terminal for at least one thumbnail may further be received, where the download command carries an index corresponding to the at least one thumbnail, the corresponding multimedia data is searched for according to the index corresponding to the thumbnail, and the found multimedia data is sent to the second mobile terminal.

In this embodiment, the user may generate a multimedia download command by selecting a thumbnail. For example, the user clicks at least one thumbnail to choose a thumbnail, and next, clicks a download button provided on a thumbnail display interface to generate a download command for the chosen thumbnail. After receiving the multimedia download command, the aircraft acquires corresponding multimedia data according to an index corresponding to the thumbnail and delivers the multimedia data to the second mobile terminal.

In another embodiment, the step of synchronizing the multimedia data to a second mobile terminal that accesses the multimedia data includes: receiving a multimedia viewing command sent by the second mobile terminal; and acquiring the first authorized-user identifier submitted by the first mobile terminal that currently operates an aircraft, searching for multimedia data by using the first authorized-user identifier as an index identifier, and synchronizing the multimedia data to the second mobile terminal.

In this embodiment, the second mobile terminal may not carry any user identifier, but instead directly connects to the aircraft and sends a multimedia viewing command the aircraft. The aircraft acquires the first authorized-user identifier bound to the aircraft. The first authorized-user identifier may be an authorized-user identifier submitted by the first mobile terminal that is currently connected to the aircraft and operates the aircraft to perform flight control. If the aircraft is not operated by a mobile terminal, the first authorized-user identifier may be an authorized-user identifier that is recorded in the aircraft most recently. Further, the aircraft searches for multimedia data by using the first authorized-user identifier as an index identifier, and synchronizes the multimedia data to the second mobile terminal. Specifically, the aircraft may generate a thumbnail of multimedia data and an index of each piece of multimedia and correspondingly send the thumbnail of multimedia and the index of each piece of multimedia to the second mobile terminal. After receiving a thumbnail and a corresponding index, the second mobile terminal displays the thumbnail.

Further, in some embodiments, a download command sent by the second mobile terminal for at least one thumbnail may further be received, where the download command carries an index corresponding to the at least one thumbnail, the corresponding multimedia data is searched for according to the index corresponding to the thumbnail, and the found multimedia data is sent to the second mobile terminal. In this embodiment, a user may generate a multimedia download command by selecting a thumbnail. For example, the user clicks at least one thumbnail to choose a thumbnail, and next, clicks a download button provided on a thumbnail display interface to generate a download command for the chosen thumbnail. After receiving the multimedia download command, the aircraft acquires corresponding multimedia data according to an index corresponding to the thumbnail and delivers the multimedia data to the second mobile terminal.

In this embodiment, regardless of whether an aircraft is being operated or not, a second mobile terminal does not need to carry any user identifier, and may directly acquire multimedia data stored in the aircraft, so that it is convenient to share the multimedia data stored in the aircraft, and the multimedia can be flexibly synchronized between the aircraft and multiple mobile terminals.

In another embodiment, the step of synchronizing the multimedia data to a second mobile terminal that accesses the multimedia data includes: receiving a multimedia viewing command sent by the second mobile terminal, where the multimedia viewing command carries a second authorized-user identifier, acquiring the first authorized-user identifier that has a friend link with the second authorized-user identifier, searching for multimedia data by using the first authorized-user identifier as an index identifier, and synchronizing the multimedia data to the second mobile terminal.

In some embodiments, the step of synchronizing the multimedia data to a second mobile terminal that accesses the multimedia data includes: receiving a multimedia viewing command sent by the second mobile terminal, where the multimedia viewing command carries a second authorized-user identifier, monitoring whether friend link data exists between the first authorized-user identifier submitted by the first mobile terminal that currently operates an aircraft and the second authorized-user identifier, and if friend link data exists, searching for multimedia data by using the first authorized-user identifier as an index identifier, and synchronizing the multimedia data to the second mobile terminal.

In some embodiments, the aircraft stores a friend link of the first authorized-user identifier. After receiving the multimedia viewing command of the second mobile terminal, the aircraft may acquire, according to the stored friend link, the first authorized-user identifier that has a friend link with the second authorized-user identifier, so as to search for multimedia data by using the first authorized-user identifier as an index identifier, and synchronize the multimedia data to the second mobile terminal.

In some embodiments, the step of synchronizing the multimedia data to a second mobile terminal that accesses the multimedia data includes: receiving a second authorized-user identifier sent by the second mobile terminal; performing authentication on the second authorized-user identifier, searching a server for at least one first authorized-user identifier that is stored in an aircraft and has friend link data with the second authorized-user identifier, sending the found first authorized-user identifier to the second mobile terminal, and displaying a multimedia folder of the first authorized-user identifier on an application interface of the second mobile terminal; and receiving a viewing command sent by the second mobile terminal for the multimedia folder, writing the viewing command to the first authorized-user identifier corresponding to the multimedia folder, searching for multimedia data by using the first authorized-user identifier as an index identifier, and synchronizing the multimedia data to the second mobile terminal.

Figure 32D:
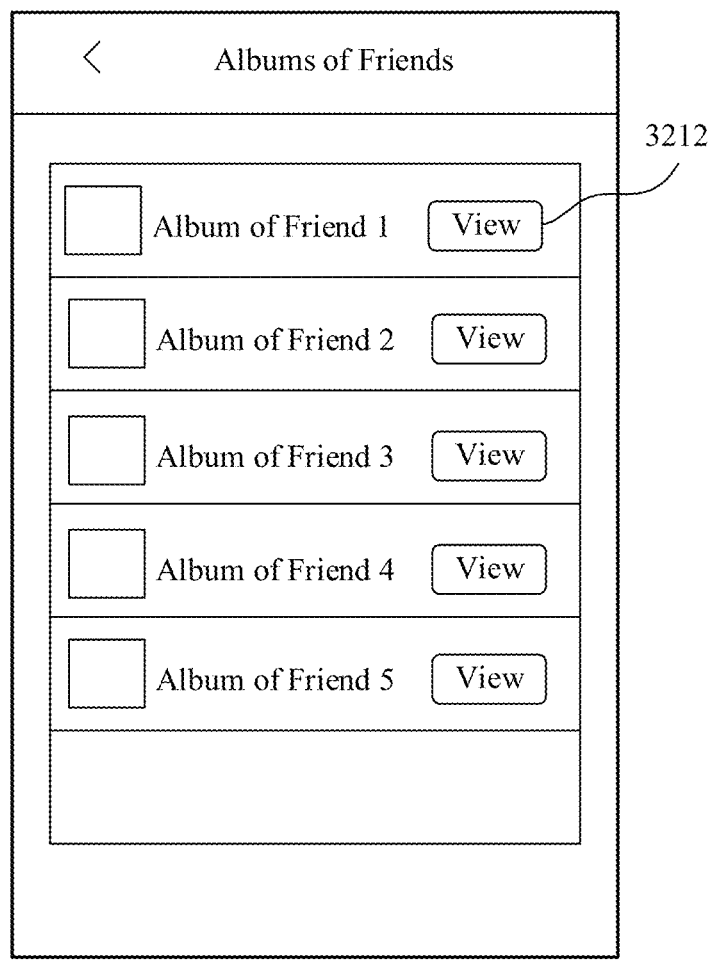
FIG. 32D is a schematic diagram of an interface for selecting multimedia data of a friend in some embodiments.

Specifically, the second mobile terminal may connect to the aircraft and send a multimedia viewing command to the aircraft. After receiving the second authorized-user identifier, the aircraft acquires, from the server by using the second mobile terminal, the first authorized-user identifier that has a friend link with the second authorized-user identifier, then further searches for stored multimedia data by using the acquired first authorized-user identifier as an index identifier, and synchronizes the multimedia data to the second mobile terminal. Further, when acquiring the first authorized-user identifier that has a friend link with the second authorized-user identifier, the aircraft may send the locally stored first authorized-user identifier to the second mobile terminal, and present, in a list form, the first authorized-user identifier that is stored a current time and has a friend link with the second authorized-user identifier. As shown in FIG. 32D, related information of the first authorized-user identifier that is stored in the aircraft and has a friend link with the second authorized-user identifier is presented by using a list, and a button 3212 used for viewing multimedia data of a friend is provided on an interface. Multimedia data of friends that is stored in the aircraft may be viewed by clicking the button 3212. Further, the second mobile terminal may acquire the first authorized-user identifier selected by a user, and send, to the aircraft, a multimedia viewing command that carries the selected first authorized-user identifier. The aircraft further searches for the stored multimedia data by using the selected first authorized-user identifier as an index identifier, and synchronizes the multimedia data to the second mobile terminal.

Figure 32E:
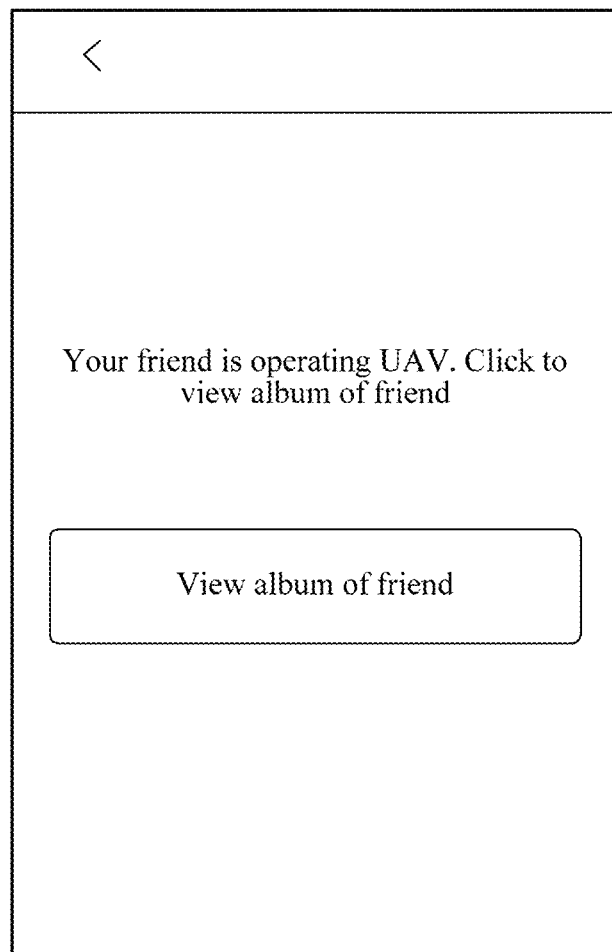
FIG. 32E is a schematic diagram of an interface for prompting that multimedia data of a friend may be downloaded in some embodiments.

Specifically, in another embodiment, the aircraft is currently operated by the first mobile terminal to perform flight control. The second mobile terminal may connect to the aircraft and send, to the aircraft, a multimedia viewing command that carries the second authorized-user identifier. The aircraft monitors whether a friend link exists between the second authorized-user identifier and the first authorized-user identifier. Specifically, when receiving the second authorized-user identifier, the aircraft may monitor whether a friend link between the first authorized-user identifier and the second authorized-user identifier exists locally. Alternatively, after receiving the second authorized-user identifier, the aircraft may send, by using the second mobile terminal, the first authorized-user identifier and the second authorized-user identifier to the server to monitor whether a friend link exists between the first authorized-user identifier and the second authorized-user identifier. Further, when detecting that a friend link exists between the second authorized-user identifier and the first authorized-user identifier, the aircraft may send prompt information to the second mobile terminal, to prompt that a current user may view multimedia data of friends of the user, as shown in FIG. 32E. Furthermore, the second mobile terminal may acquire a multimedia viewing command of the user for viewing multimedia data of a friend, and send the multimedia viewing command to the aircraft. The aircraft searches for multimedia data by using the first authorized-user identifier as an index identifier, and synchronizes the multimedia data to the second mobile terminal. Specifically, the aircraft may generate a thumbnail of multimedia and an index of each piece of multimedia and correspondingly send the thumbnail of multimedia and the index of each piece of multimedia to the second mobile terminal. After receiving a thumbnail and a corresponding index, the second mobile terminal displays the thumbnail.

Further, in some embodiments, the aircraft may further receive a download command sent by the second mobile terminal for at least one thumbnail. The download command carries an index corresponding to the at least one thumbnail. The aircraft searches for the corresponding multimedia data according to the index corresponding to the thumbnail. The aircraft sends the found multimedia data to the second mobile terminal.

The friend link includes, but is not limited to, a friend relationship in an instant messaging application, a follower relationship or a listener relationship in a social networking application, and the like.

In this embodiment, a second mobile terminal may access, by using a second authorized-user identifier that has a friend link with a first authorized-user identifier, multimedia data stored in an aircraft, so that the multimedia data in the aircraft not only can be synchronized among multiple mobile terminals, but also can be shared between friends in an instantly communication application, followers or listeners in a social networking application, and the like, so that a novel multimedia synchronization manner is provided.

In some embodiments, the multimedia synchronization method further includes: receiving a multimedia synchronization command sent by the first mobile terminal or the second mobile terminal; acquiring multimedia data in the first mobile terminal or the second mobile terminal, and comparing the multimedia data in the first mobile terminal or the second mobile terminal with multimedia data locally stored in an aircraft; and if a comparison result is that the multimedia data in the first mobile terminal or the second mobile terminal is inconsistent with the multimedia data locally stored in the aircraft, synchronizing, to the first mobile terminal or the second mobile terminal, the multimedia data locally stored in the aircraft.

Specifically, in some embodiments, the multimedia synchronization command may be automatically sent to the aircraft when the first mobile terminal or the second mobile terminal sends a multimedia viewing command to the aircraft, or may be a synchronization command generated after a prompt box is popped up to prompt a user each time when the first mobile terminal or the second mobile terminal connects to the aircraft and a confirmation command of the user is acquired. In an application scenario, by using any mobile terminal, the user may view the multimedia data stored in the aircraft and may perform an edit operation on the multimedia data in the aircraft, for example, delete or add a multimedia picture or video. When connecting to the aircraft again, the first mobile terminal or the second mobile terminal may send the multimedia synchronization command the aircraft. After receiving the multimedia synchronization command, the aircraft compares the multimedia data in the first mobile terminal or the second mobile terminal with multimedia data stored a current time in the aircraft; and if a comparison result is that the multimedia data in the first mobile terminal or the second mobile terminal is inconsistent with the multimedia data stored a current time in the aircraft, synchronize, to the first mobile terminal or the second mobile terminal, the multimedia data locally stored in the aircraft.

In another application scenario, in a process in which the first mobile terminal operates the aircraft to perform flight control and collect multimedia data in a target photographing region, the first mobile terminal may view the multimedia data obtained through photographing by the aircraft, and may perform an edit operation on multimedia data corresponding to the first authorized-user identifier, for example, delete multimedia data. As discussed above, during operation of the aircraft by the first mobile terminal, the second mobile terminal may view the multimedia data stored in the aircraft, and send the multimedia synchronization command to the aircraft, so as to update, to the second mobile terminal, the multimedia data updated in the aircraft.

More specifically, the aircraft may receive an index that is of multimedia and is uploaded by the first mobile terminal or the second mobile terminal, compare the index with an index locally stored in the aircraft, and if a comparison result is that the index is inconsistent with the index locally stored in the aircraft, update the index stored in the terminal according to the index locally stored in the aircraft, so that the index that is of multimedia and is stored in the first mobile terminal or the second mobile terminal can be consistent with the index stored in the aircraft, so as to synchronize, to the first mobile terminal or the second mobile terminal, the multimedia data locally stored in an aircraft.

In another embodiment, the multimedia synchronization command may further be an edit operation command for multimedia data stored in the first mobile terminal or the second mobile terminal, for example, a delete command and an add command. In this embodiment, when an edit operation is performed on the multimedia data stored in the first mobile terminal or the second mobile terminal, a multimedia synchronization command may be sent to the aircraft connected to the first mobile terminal or the second mobile terminal, and the first mobile terminal or the second mobile terminal may synchronize the local multimedia data to the aircraft.

A person of ordinary skill in the art may understand that all or some of the steps in the methods of the foregoing embodiments may be implemented by a computer program instructing relevant hardware. The program may be stored in a computer-readable storage medium. When the program is run, the procedures of the embodiments of the foregoing method are performed. The storage medium may be a non-volatile storage medium such as a magnetic disk, an optical disk, and a Read-Only Memory (ROM), a Random Access Memory (RAM), or the like.

The technical features of the foregoing embodiments may be arbitrarily combined. For simplicity of description, all possible combinations of the technical features in the foregoing embodiments are described. However, it should be considered that these combinations of technical features fall within the scope recorded in this specification as long as no contradiction exists in these combinations of technical features.

The foregoing embodiments only describe several implementation manners of the present disclosure, and their description is specific and detailed, but cannot therefore be understood as a limitation to the patent scope of the present disclosure. It should be noted that a person of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A method for operating an aircraft performed by a mobile terminal, the mobile terminal having one or more processors, one or more sensors and memory for storing a plurality of instructions to be executed by the one or more processors, the method comprising:
    after establishing a wireless communication between the aircraft and the mobile terminal:
        displaying an aircraft operation interface on a touchscreen of the mobile terminal;
        detecting a first touch operation applied on the aircraft operation interface;
        in accordance with a determination that the first touch operation includes a touch-and-hold input that is detected in a first touch control region on the aircraft operation interface,
        while the touch-and-hold input of the first touch operation keeps in contact with the touchscreen of the mobile terminal, enabling a sensor control mode, comprising:
            detecting a movement of the mobile terminal while the touch-and-hold input keeps in contact with the touchscreen of the mobile terminal;
            acquiring sensor data from the one or more sensors during the movement of the mobile terminal;
            generating a visual representation of the movement of the mobile terminal according to the sensor data of the mobile device in the aircraft operation interface, wherein the visual representation comprises an operation gesture corresponding to a preset automatic operation mode icon;
            determining aircraft operation command according to (1) change of the sensor data during the movement of the mobile terminal and (2) a predetermined relationship between the sensor data of the mobile device and the aircraft operation command for operating the aircraft; and
            sending the aircraft operation command from the mobile terminal to the aircraft via the wireless communication, wherein the aircraft is configured to perform a predefined operation according to the operation command.

2. The method according to claim 1, further comprising:
    detecting a second touch operation in the first touch control region on the aircraft operation interface;
    in accordance with the second touch operation, disabling the sensor control mode by stopping acquiring sensor data.

3. The method according to claim 1, further comprising:
    starting to measure a time when a third touch operation is detected,
    in accordance with determining that a measured time reaches preset duration and the third touch operation is kept being applied in the first touch control region on the aircraft operation interface:
        acquiring sensor data,
        obtaining an aircraft operation command at least according to the sensor data, and
        stopping acquiring sensor data until the third touch operation.

4. The method according to claim 1, further comprising:
    detecting a drag operation starting from a touch control button in a second touch control region on the aircraft operation interface;

in accordance with detecting the drag operation in the second touch region, acquiring sensor data;

tracking a movement of the drag operation starting from the touch control button towards a first direction in the second touch control region on the aircraft operation interface;

in accordance with the movement of the drag operation, acquiring a simulated-joystick operation command according to the movement of the drag operation;

obtaining the aircraft operation command according to the sensor data and the simulated-joystick operation command.

5. The method according to claim 1, wherein the aircraft operation command is configured to operate the aircraft to move horizontally, and the simulated-joystick operation command is configured to operate the aircraft to move vertically.

6. The method according to claim 1, wherein the operation of determining the aircraft operation command comprises:

determining, according to acquired initial sensor data, an initial status of a mobile terminal;

determining a subsequent status of the mobile terminal according to subsequent sensor data; and generating the aircraft operation command according to a change of the subsequent status from the initial status of the mobile device, the aircraft operation command including a type of the change of the subsequent status from the initial status of the mobile device and a magnitude of the change of the subsequent status from the initial status of the mobile device.

7. The method according to claim 1, further comprising:

detecting a selection of the preset automatic operation mode icon on the aircraft operation interface;

determining a corresponding preset automatic operation mode according to the selection;

reading a combined aircraft operation command associated with the determined preset automatic operation mode; and sending the combined aircraft operation command to the aircraft, so that the aircraft sequentially performs a corresponding series of actions according to the combined aircraft operation command.

8. The method according to claim 7, wherein the preset automatic operation mode comprises at least one of a same-location landing mode, a preset-location returning and landing mode, an in-flight emergency hover mode, and a follow-locked-target flight mode.

9. A mobile terminal comprising:

one or more processors;

memory; and a plurality of computer readable instructions stored in the memory, wherein the computer readable instructions, when executed by the one or more processors, cause the one or more processors to perform the following operations:

after establishing a wireless communication between the aircraft and the mobile terminal:

displaying an aircraft operation interface on a touchscreen of the mobile terminal;

detecting a first touch operation applied on the aircraft operation interface;

in accordance with a determination that the first touch operation includes a touch-and-hold input that is detected in a first touch control region on the aircraft operation interface, while the touch-and-hold input of the first touch operation keeps in contact with the touchscreen of the mobile terminal, enabling a sensor control mode, comprising:

detecting a movement of the mobile terminal while the touch-and-hold input keeps in contact with the touchscreen of the mobile terminal;

acquiring sensor data from the one or more sensors during the movement of the mobile terminal;

generating a visual representation of the movement of the mobile terminal according to the sensor data of the mobile device in the aircraft operation interface, wherein the visual representation comprises an operation gesture corresponding to a preset automatic operation mode icon;

determining aircraft operation command according to (1) change of the sensor data during the movement of the mobile terminal and (2) a predetermined relationship between the sensor data of the mobile device and the aircraft operation command for operating the aircraft; and sending the aircraft operation command from the mobile terminal to the aircraft via the wireless communication, wherein the aircraft is configured to perform a predefined operation according to the operation command.

10. The mobile terminal according to claim 9, wherein the operations further comprise:

detecting a second touch operation in the first touch control region on the aircraft operation interface;

in accordance with the second touch operation, disabling the sensor control mode by stopping acquiring sensor data.

11. The mobile terminal according to claim 9, wherein the operations further comprise:

starting to measure a time when a third touch operation is detected, in accordance with determining that a measured time reaches preset duration and the third touch operation is kept being applied in the first touch control region on the aircraft operation interface:

acquiring sensor data, obtaining an aircraft operation command at least according to the sensor data, and stopping acquiring sensor data until the third touch operation.

12. The mobile terminal according to claim 9, wherein operations further comprise:

detecting a drag operation starting from a touch control button in a second touch control region on the aircraft operation interface;

in accordance with detecting the drag operation in the second touch region, acquiring sensor data;

tracking a movement of the drag operation starting from the touch control button towards a first direction in the second touch control region on the aircraft operation interface;

in accordance with the movement of the drag operation, acquiring a simulated-joystick operation command according to the movement of the drag operation;

obtaining the aircraft operation command according to the sensor data and the simulated-joystick operation command.

13. The mobile terminal according to claim 9, wherein the aircraft operation command is configured to operate the aircraft to move horizontally, and the simulated-joystick operation command is configured to operate the aircraft to move vertically.

14. The mobile terminal according to claim 9, wherein the operation of determining the aircraft operation command comprises:
   determining, according to acquired initial sensor data, an initial status of a mobile terminal;
   determining a subsequent status of the mobile terminal according to subsequent sensor data; and
   generating the aircraft operation command according to a change of the subsequent status from the initial status of the mobile device, the aircraft operation command including a type of the change of the subsequent status from the initial status of the mobile device and a magnitude of the change of the subsequent status from the initial status of the mobile device.

15. The mobile terminal according to claim 9, wherein the operations further comprise:
   detecting a selection of the preset automatic operation mode icon on the aircraft operation interface;
   determining a corresponding preset automatic operation mode according to the selection;
   reading a combined aircraft operation command associated with the determined preset automatic operation mode; and
   sending the combined aircraft operation command to the aircraft, so that the aircraft sequentially performs a corresponding series of actions according to the combined aircraft operation command.

16. A non-transitory computer-readable storage medium storing instructions, the instructions, when executed by a mobile terminal having one or more processors, cause the one or more processors to perform a plurality of operations including:
   after establishing a wireless communication between the aircraft and the mobile terminal:
      displaying an aircraft operation interface on a touchscreen of the mobile terminal;
      detecting a first touch operation applied on the aircraft operation interface;
      in accordance with a determination that the first touch operation includes a touch-and-hold input that is detected in a first touch control region on the aircraft operation interface,
         while the touch-and-hold input of the first touch operation keeps in contact with the touchscreen of the mobile terminal, enabling a sensor control mode, comprising:
            detecting a movement of the mobile terminal while the touch-and-hold input keeps in contact with the touchscreen of the mobile terminal;
            acquiring sensor data from the one or more sensors during the movement of the mobile terminal;
            generating a visual representation of the movement of the mobile terminal according to the sensor data of the mobile device in the aircraft operation interface, wherein the visual representation comprises an operation gesture corresponding to a preset automatic operation mode icon;
            determining aircraft operation command according to (1) change of the sensor data during the movement of the mobile terminal and (2) a predetermined relationship between the sensor data of the mobile device and the aircraft operation command for operating the aircraft; and
            sending the aircraft operation command from the mobile terminal to the aircraft via the wireless communication, wherein the aircraft is configured to perform a predefined operation according to the operation command.

17. The non-transitory computer-readable storage medium according to claim 16, further comprising:
   detecting a second touch operation in the first touch control region on the aircraft operation interface;
   in accordance with the second touch operation, disabling the sensor control mode by stopping acquiring sensor data.

18. The non-transitory computer-readable storage medium according to claim 16, further comprising:
   starting to measure a time when a third touch operation is detected,
   in accordance with determining that a measured time reaches preset duration and the third touch operation is kept being applied in the first touch control region on the aircraft operation interface:
      acquiring sensor data,
      obtaining an aircraft operation command at least according to the sensor data, and
      stopping acquiring sensor data until the third touch operation.

19. The non-transitory computer-readable storage medium according to claim 16, further comprising:
   detecting a drag operation starting from a touch control button in a second touch control region on the aircraft operation interface;
   in accordance with detecting the drag operation in the second touch region, acquiring sensor data;
   tracking a movement of the drag operation starting from the touch control button towards a first direction in the second touch control region on the aircraft operation interface;
   in accordance with the movement of the drag operation, acquiring a simulated-joystick operation command according to the movement of the drag operation;
   obtaining the aircraft operation command according to the sensor data and the simulated-joystick operation command.

20. The non-transitory computer-readable storage medium according to claim 16, wherein the aircraft operation command is configured to operate the aircraft to move horizontally, and the simulated-joystick operation command is configured to operate the aircraft to move vertically.

* * * * *